United States Patent
Maller

(10) Patent No.: US 10,454,907 B2
(45) Date of Patent: Oct. 22, 2019

(54) TIERED KEY COMMUNICATION SYSTEM AND METHOD IN SUPPORT OF CONTROLLED VENDOR MESSAGE PROCESSING

(71) Applicant: Jay Maller, Stamford, CT (US)

(72) Inventor: Jay Maller, Stamford, CT (US)

(73) Assignee: ECO-MAIL DEVELOPMENT, LLC, Katonah, NY (US)

( * ) Notice: Subject to any disclaimer, the term of this patent is extended or adjusted under 35 U.S.C. 154(b) by 635 days.

(21) Appl. No.: 14/318,074

(22) Filed: Jun. 27, 2014

(65) Prior Publication Data

US 2014/0344056 A1  Nov. 20, 2014

Related U.S. Application Data

(63) Continuation of application No. 12/848,634, filed on Aug. 2, 2010, now Pat. No. 8,787,581.

(Continued)

(51) Int. Cl.
H04L 29/06 (2006.01)
G06Q 30/02 (2012.01)
(Continued)

(52) U.S. Cl.
CPC .......... *H04L 63/0435* (2013.01); *G06F 21/60* (2013.01); *G06Q 30/02* (2013.01);
(Continued)

(58) Field of Classification Search
None
See application file for complete search history.

(56) References Cited

U.S. PATENT DOCUMENTS 6,081,601 A   6/2000  Raivisto
7,305,711 B2 * 12/2007  Ellison ............. G11B 20/00086
                                                          713/193

(Continued)

FOREIGN PATENT DOCUMENTS

EP   1 701 501   9/2006

OTHER PUBLICATIONS

Parker, Geoffrey et al. "A Digital Postal Platform: Definitions and a Roadmap," The MIT Center for Digital Business, Jan. 2012, pp. 1-31.

*Primary Examiner* — Esther B. Henderson
(74) *Attorney, Agent, or Firm* — Leason Ellis LLP

(57) ABSTRACT

A computer-implemented system processes secure electronic documents from one or more content providers in accordance with subscriber instructions has a processor and modules operative within the processor. A monitoring module obtains a provider GUID, a subscriber GUID, and a transaction ID from public metadata associated with a transaction received from a particular content provider. A determination module determines any designees of the subscriber and contact information one or more of the subscriber and any designees. A transaction module distributes a transaction addressed to at least one of the subscriber and any designees. Each distributed transaction includes data that is used for management, tracking, and alerting. Also described is a station for constructing transactions for distribution to subscribers through such a system, and management of local-advertising to users of such a system. An end-to-end system and method are described.

18 Claims, 24 Drawing Sheets

Related U.S. Application Data

(60) Provisional application No. 61/232,334, filed on Aug. 7, 2009.

(51) Int. Cl.
*H04L 9/08* (2006.01)
*H04L 9/32* (2006.01)
*G06F 21/60* (2013.01)
*H04L 12/58* (2006.01)

(52) U.S. Cl.
CPC ..... *G06Q 30/0258* (2013.01); *G06Q 30/0261* (2013.01); *H04L 9/083* (2013.01); *H04L 9/0825* (2013.01); *H04L 9/321* (2013.01); *H04L 51/00* (2013.01); *H04L 2209/56* (2013.01); *H04L 2209/60* (2013.01)

(56) References Cited

U.S. PATENT DOCUMENTS

| | | | |
|---|---|---|---|
| 7,340,048 B2 * | 3/2008 | Stern | H04M 3/4931 379/218.01 |
| 8,336,079 B2 | 12/2012 | Budko et al. | |
| 8,443,185 B2 | 5/2013 | Maller | |
| 8,787,581 B2 | 7/2014 | Maller | |
| 2002/0007453 A1 | 1/2002 | Nemovicher | |
| 2003/0081791 A1 | 5/2003 | Erickston et al. | |
| 2003/0105712 A1 | 6/2003 | Bodensohn | |
| 2003/0110130 A1 | 6/2003 | Pelletier | |
| 2003/0158960 A1 | 8/2003 | Engberg | |
| 2007/0076857 A1 * | 4/2007 | Chava | H04L 45/00 379/88.17 |
| 2007/0113101 A1 | 5/2007 | Levasseur | |
| 2008/0098237 A1 | 4/2008 | Dung et al. | |
| 2008/0172381 A1 * | 7/2008 | Suh | G06Q 10/06 |
| 2009/0164781 A1 * | 6/2009 | Bouchard | H04L 63/0428 713/165 |
| 2011/0033050 A1 | 2/2011 | Maller | |

* cited by examiner

| Key Type 1305 | Subscriber 1310 | Provider ID 1315 | PKI Public Key 1320 | Start Date 1325 | End Date 1330 | Sub-Subscriber #1 1335a | Sub-Subscriber #2 1335b | Sub-Subscriber #3 1335c |
|---|---|---|---|---|---|---|---|---|
| Primary | 111222333 | N/A | 3355379433411 | 80601124000 | | N/A | N/A | N/A |
| Secondary | 111222333 | ATT1234 | 80979766563 | 80601124500 | 90328081756 | 123456789 | 234567890 | 345678901 |
| Secondary | 111222333 | VER2345 | 64643675698O | 80601124500 | | | 123456789 | 345678901 |
| Secondary | 111222333 | NWM1002 | 56347597780 | 80601124500 | | | | 123456789 |
| Secondary | 111222333 | ATT1234 | 75814469073 | 90328081757 | | 234567890 | 345678901 | 456789012 |

| | Key Type 1305 | Subscriber 1310 | Provider ID 1315 | PKI Private Key 1350 | Start Date 1325 | End Date 1330 |
|---|---|---|---|---|---|---|
| 1352 | Primary | 111222333 | N/A | 8757589857 | 20080601124000 | |
| 1354 | Secondary | 111222333 | ATT1234 | 8734873408 | 20080601124500 | 20090328081756 |
| 1356 | Secondary | 111222333 | VER2345 | 454627253463 | 20080601124500 | |
| 1358 | Secondary | 111222333 | NWM1002 | 12278819190 | 20080601124500 | |
| 1360 | Secondary | 111222333 | ATT1234 | 67635472732 | 20090328081757 | |
| 1362 | CopyFwd | 222333444 | CED765 | 7439863 | 20090506081204 | 20090708153227 |
| 1364 | CopyFwd | 222333444 | CED765 | 243634930272 | 20090708153228 | |
| 1366 | CopyFwd | 333444555 | CIG942 | 98325423453 | 20090709181234 | |
| 1368 | CopyFwd | 444555666 | DTV213 | 44748402824 | 20090726063737 | |
| 1370 | CopyFwd | 444555666 | GAP866 | 48484844990 | 20090726063737 | |
| | CopyFwd | 444555666 | JPM444 | 1215483342 | 20090726063737 | |

FIG. 13A

| Public Meta Data Table | |
|---|---|
| INDUSTRY | ALL |
| SUB-INDUSTRY | ALL |
| DOCUMENT TYPE | ALL |
| | |
| | |
| | |
| Provider GUID | REQUIRED |
| Recipient GUID | VARIABLE |
| Subscriber GUID | REQUIRED |
| Eco-Mail Transaction ID | REQUIRED |
| Provider Industry Type | REQUIRED |
| Document Type | REQUIRED |
| Provider Sub-Industry Type | REQUIRED |
| Encrypted eDoc Key | REQUIRED |
| Primary/Secondary Flag | REQUIRED |
| Action Required Indicator | REQUIRED |
| Action Required Date | VARIABLE |

1410 { (bracketing the lower group of rows)

FIG. 14A

| Meta Data Template Table | PRIVATE | PRIVATE | PRIVATE | PRIVATE | PRIVATE | PRIVATE | PRIVATE |
|---|---|---|---|---|---|---|---|
| INDUSTRY | FINANCIAL | FINANCIAL | FINANCIAL | FINANCIAL | FINANCIAL | FINANCIAL | FINANCIAL |
| SUB-INDUSTRY | BANKING | BANKING | BANKING | BANKING | BANKING | BANKING | BANKING |
| DOCUMENT TYPE | STATEMENT | INVOICE | LEGAL | SVC CHANGE | SECURITY | MARKETING | OTHER |
| Public Meta Data | ALL PUBLIC META DATA REQUIRED FOR ALL eDOC TYPES (FIG 14A) | | | | | | |
| Provider Transaction ID | REQUIRED | REQUIRED | REQUIRED | REQUIRED | REQUIRED | REQUIRED | REQUIRED |
| Provider Transaction Date | REQUIRED | REQUIRED | REQUIRED | REQUIRED | REQUIRED | REQUIRED | REQUIRED |
| Account Number | REQUIRED | REQUIRED | REQUIRED | REQUIRED | REQUIRED | REQUIRED | REQUIRED |
| Account Type | REQUIRED | REQUIRED | REQUIRED | REQUIRED | REQUIRED | REQUIRED | REQUIRED |
| Account Physical Address | REQUIRED | REQUIRED | REQUIRED | REQUIRED | REQUIRED | REQUIRED | REQUIRED |
| Additional Account Entities | REQUIRED | REQUIRED | REQUIRED | REQUIRED | VARIABLE | VARIABLE | REQUIRED |
| Period Start Date | VARIABLE | REQUIRED | VARIABLE | VARIABLE | VARIABLE | VARIABLE | VARIABLE |
| Period End Date | VARIABLE | REQUIRED | VARIABLE | VARIABLE | VARIABLE | VARIABLE | VARIABLE |
| Tax Related Information | REQUIRED | REQUIRED | REQUIRED | REQUIRED | N/A | N/A | VARIABLE |
| Total Amount Due | VARIABLE | REQUIRED | N/A | N/A | N/A | N/A | VARIABLE |
| Minimum Amount Due | VARIABLE | REQUIRED | N/A | N/A | N/A | N/A | VARIABLE |
| Payment Status | VARIABLE | REQUIRED | N/A | N/A | N/A | N/A | VARIABLE |
| Payment Types Accepted | VARIABLE | REQUIRED | N/A | N/A | N/A | VARIABLE | VARIABLE |
| Services Provided To | N/A | N/A | N/A | N/A | N/A | N/A | N/A |
| Service Provider | N/A | N/A | N/A | N/A | N/A | N/A | N/A |

TIERED KEY COMMUNICATION SYSTEM AND METHOD IN SUPPORT OF CONTROLLED VENDOR MESSAGE PROCESSING

This application claims the benefit of priority from U.S. Provisional Application Ser. No. 61/232,334, filed Aug. 7, 2009, entitled "System And Method For Management And Processing Of Electronic Vendor Mail," which is hereby incorporated by reference as if set forth in its entirety herein.

FIELD OF THE INVENTION

The present invention relates to improvements in commercial mail distribution and, more particularly, to a structured, secure and controlled electronic document distribution system to supplant at least a significant portion of existing physical mail distribution systems by providing a secure, end-to-end communication bridge for message transfer between vendors and their customers as an alternative to physical mail and conventional electronic mail, and services in support of such users. In a related aspect, the invention relates to relationship management between vendors and their customers. The invention can also provide local vendor advertisements on-demand, optionally, with feedback input by other customers of the local vendors.

BACKGROUND OF THE INVENTION

In the past, distribution of commercial mail has depended on a large and complex process centered around the movement of paper. Paper needed to be delivered to the mail provider as raw material in the printing of documents. Paper also needed to be moved from the point of printing to the United States Postal Service (USPS) and within the USPS to a recipient destination. Even after delivery to the recipient, paper must be managed in order to reach the intended recipient or otherwise undergo an organization's processing requirements before ultimately being forwarded to long-term storage or disposal. These processes were necessary and reasonably efficient in a world where digital communication did not exist; however, the point of the process was never to move paper, but rather to move data. In today's electronic world it is entirely possible to reengineer the process to eliminate paper and remove the steps and costs associated with movement of physical mail.

The advent of email allows data to be quickly moved from one point to another without the need for paper or all of the requisite steps and costs of moving paper. The volume of email transacted daily has grown to quantities that are difficult to imagine. Nevertheless, current implementations of email do not adequately meet many of the requirements of commercial mail from either a provider or recipient standpoint. Email addresses may be transient and it is difficult to determine if any given address is either current or valid. Content within the body of an email is often unstructured and largely inconsistent. Email is relatively unsecure and can be intercepted more readily than physical mail as the later requires both the mail and the interceptor to be in the same place at the same time. Moreover, verification of normal email delivery is uncertain. Another complexity in traditional email management concerns the manner of organizing emails. Organization of email is at the discretion of the recipient, and management and processing of email messages are subject to the diligence of the user. Finally, if not appropriately backed up, email can be lost and irretrievable. As a direct result of these limitations, commercial providers have shied away from email as the primary form for distributing electronic versions of commercial mail.

Yet some commercial providers have begun utilizing "paperless" alternatives. This method eliminates the paper and the components of the legacy process that relate to moving physical paper. Unfortunately, however, the paperless alternatives available so far have been less desirable than paper-based delivery methods because they lack the passive receipt and aggregation components of both physical mail and email. The predominant paperless alternatives available today require a recipient to "follow a link," sign-on to a provider website, and then open the required document. This approach prevents interception of personal or sensitive information. However, if the recipient fails to retrieve a document, he or she might miss a deadline. This is attendant with potential financial repercussions, legal implications, or both. As well, this process places additional time burdens on the recipient and can become particularly onerous if the recipient has to follow links to review materials relating to multiple commercial relationships.

A broad array of prior art exists around "Electronic Bill Presentment and Payment" systems. These systems are inherently different than other paperless systems in that they are focused on a singular type of document (an invoice) and tailored to process that one type of document. EBPP systems are directed to electronic payment and do not address non-payment related mail or many of the myriad consumer problems associated with document distribution, retention, and management.

Historically, replacements to physical mail distribution systems have been driven by providers who are motivated to lower the substantial costs associated with physical document distribution. Because the focus has been on the provider's cost, the complex requirements necessary to motivate recipients to convert away from physical document distribution have not been met. However, the current invention provides a system and method that, among other things, addresses the needs of recipients' while also lowering the costs associated with physical document distribution. Alternatively or in addition, the current invention provides a system and method that, among other things, addresses the needs of providers (e.g., document distributors) by providing audit trails of proof of delivery. Alternatively or in addition, the current invention provides a system and method that, among other things, enables providers and subscribers to accept communications from one another through a secure portal that, on the one hand, ensures that the content of such communications are shielded from viewing by any intermediary—including the secure portal, and on the other hand ensures that recipients receive only authorized messages and that they can manage and direct such messages in a private manner that is not exposed to the provider. The current invention can provide these solutions and solutions to other problems in the art as will be appreciated from the discussion below.

SUMMARY OF THE INVENTION

In accordance with a broad aspect of the invention, systems and methods are provided for secure end-to-end transmission of electronic documents from a content provider to a subscriber, in which a trusted intermediary manages, tracks and provides alerts concerning the flow of such documents. At one level, network participants access the system directly to register themselves and establish subscription relationships and rules. At another level, the system interacts on a computer-to-computer basis in an automated manner to validate, encode, encrypt, route, decrypt, organize and confirm delivery of individual document transactions.

In accordance with one aspect of the invention, a computer-implemented system processes secure electronic documents from one or more content providers in accordance with subscriber instructions. The system has a processor and a set of modules such as code that configure the processor or its host machine. A monitoring module is operative within the processor to obtain a provider GUID, a subscriber GUID, and a transaction ID from public metadata associated with a transaction received from a particular content provider. A determination module is operative within the processor to determine any designees of the subscriber and contact information of the subscriber and any designees. A transaction module is operative within the processor to construct a primary transaction addressed to the subscriber and including the transaction ID, and one or more supplemental transactions each addressed to any respective designees of the subscriber and each having a respective derivative transaction ID derived from the transaction ID.

In accordance with a further one aspect of the invention, a computer-implemented system similar to the one described above processes secure electronic documents from one or more content providers in accordance with subscriber instructions. Again, the system has a processor and a set of modules such as code that configure the processor or its host machine, including a monitoring module as described above. In accordance with this aspect of the invention, a determination module is operative within the processor to determine any designees of the subscriber and contact information one or more of the subscriber and any designees and a transaction module is operative within the processor to distribute a transaction addressed to at least one of the subscriber and any designees. Each transaction distributed by the transaction module includes one of a transaction ID and a derivative transaction ID derived from the transaction ID.

In still a further aspect of the invention, a computer-implemented system for managing transmission of encrypted electronic documents over a network is described. The electronic Documents include publicly inspectable metadata that is utilized in the exchange between a content provider and a subscriber. The system has a database having a plurality subscriber addresses and up to a plurality of supplemental addresses associated with each subscriber in relation to a document-type of the content provider. A management station has a processor that is configured by code, including optionally a plurality of code modules or a single program. The code executes in the processor to receive a particular electronic document having the metadata, obtain the public metadata associated with the particular electronic document, retrieve from the database routing information for the particular electronic database on the basis of the obtained metadata, and route the particular electronic document in accordance with the retrieved routing information.

In yet another aspect of the invention, a computer-implemented system that can be utilized by a content provider is configured to prepare content having a content type for transmission as an electronic document over a network from the content provider to a managed subscriber having a subscriber ID. The system includes a processor and a set of modules such as code that configure the processor or its host machine. A content enrichment module is operative within the processor to output an enriched content. The enriched content includes the content, public metadata, and private metadata. The public and private metadata in the enriched content is included in accordance with a standard template associated with the content type and maintained by a trusted resource independent of the content provider. A validation engine is operative within the processor to identify the content type and to compare the private metadata to the standard template associated with the content type to produce a validation signal. A key generator module is operative within the processor to respond to requests with a PRN key. An encryption module is operative within the processor, is in communication with the key generator module, and is further operative in accordance with the validation signal to request and receive the PRN key and to encrypt the content and the private metadata using the PRN key. A transaction formatting module is operative within the processor in response to any encryption by the encryption module so as to create a record that comprises the encrypted content, the encrypted private metadata, and the public metadata. A request module is operative within the processor in response to creation of the record so as to request the trusted resource for an asymmetric key and so as to include the asymmetric key in the record, wherein the asymmetric key is a public key asymmetric encryption of the PRN key. A distribution module is operative to distribute the transaction to the trusted resource.

Still a further aspect of the invention concerns a method for managing transmission of encrypted electronic documents over a network between a content provider and a subscriber. The method includes code that executes within processors of machines that are configured by the code to perform the steps of the method. The code executes at respective stations used in the method steps. At a content provider station, an electronic document that is to be sent to a selected subscriber is encrypted using a symmetric key securely retained at the content provider. Also at the content provider station, an asymmetrically-encrypted, symmetric key (AESK) is received, wherein the AESK is provided by a transaction management station in relation to the particular subscriber and the content provider. At the content provider station, a transaction is constructed that includes the encrypted electronic document, the AESK, and publicly inspectable metadata. The transaction is distributed to the transaction management station. At the transaction management station, a routing is determined for the transaction using the publicly inspectable metadata. The transaction is routed to at least one client station based on the determined routing. The transaction is unbundled, at the client station, by applying a private portion of an asymmetric key pair utilized to create the AESK, said private portion being associated with the particular subscriber and the content provider.

These and other aspects, features and arrangements of the invention can be further appreciated from the accompanying description of Certain Embodiments of the Invention and the Drawing Figures.

BRIEF DESCRIPTION OF THE DRAWING FIGURES

FIG. 1 describes an electronic commercial mail distribution network in accordance with the present invention.

FIG. 2 describes a simplified functional block diagram of the electronic commercial mail distribution network identified in FIG. 1.

FIG. 3 describes a simplified block diagram of an electronic commercial mail provider station.

FIG. 4 describes a simplified block diagram of an electronic commercial mail financial intermediary station.

FIG. 5 describes a simplified block diagram of an electronic commercial mail eDoc Reference Data Station.

FIG. 6 describes a simplified block diagram of an electronic commercial mail eDoc Transaction Management Station.

FIG. 7 describes a simplified block diagram of an electronic commercial mail recipient station.

FIG. 8 describes a consumer registration process that establishes the consumer as a unique member of the network and builds initial subscription relationships.

Figure 11:
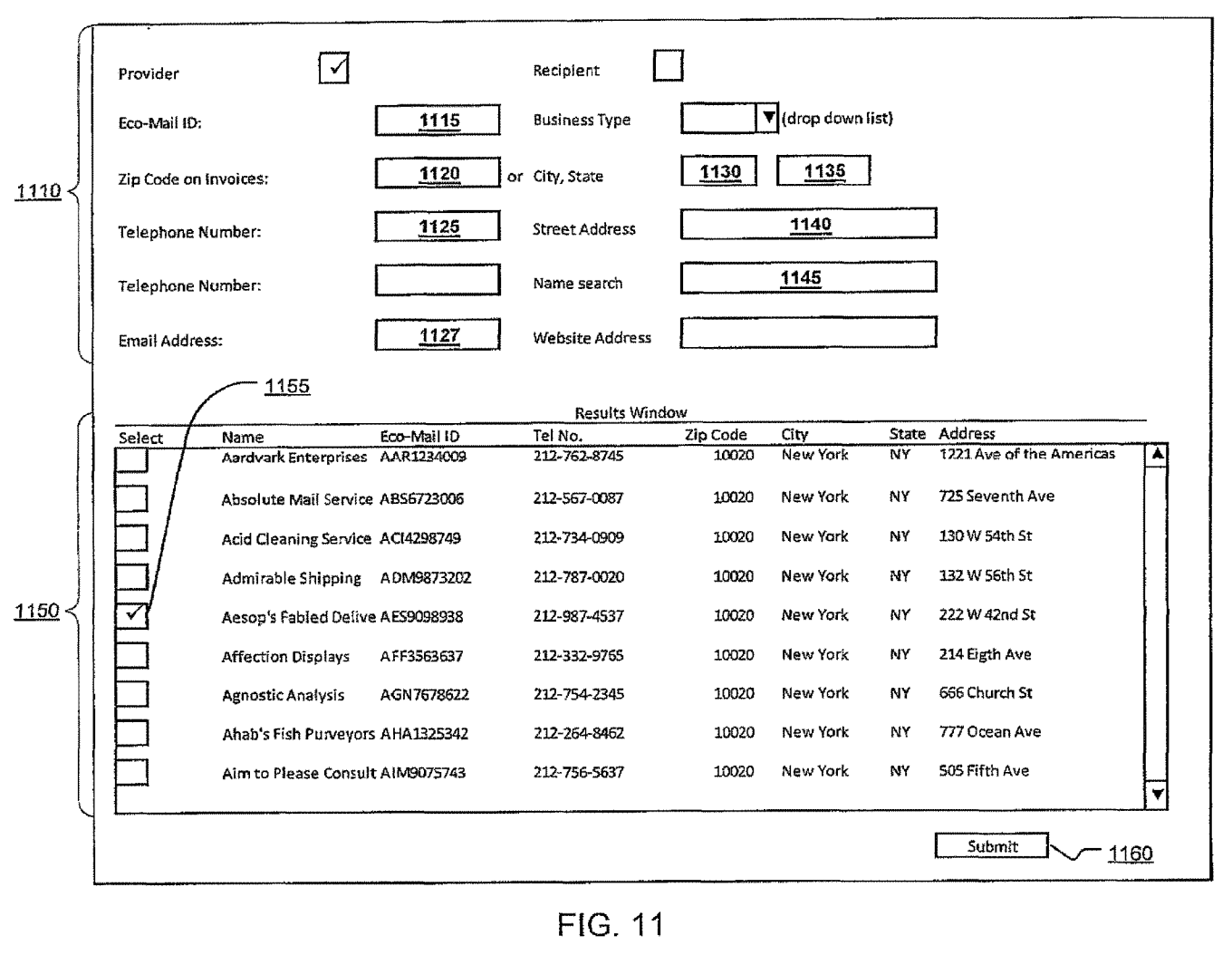

FIG. 11 describes the user interface utilized by EM Subscribers to search for eDoc Providers and other EM Subscribers they would like to add to their network for the purpose of creating subscription relationships.

Figure 12A:
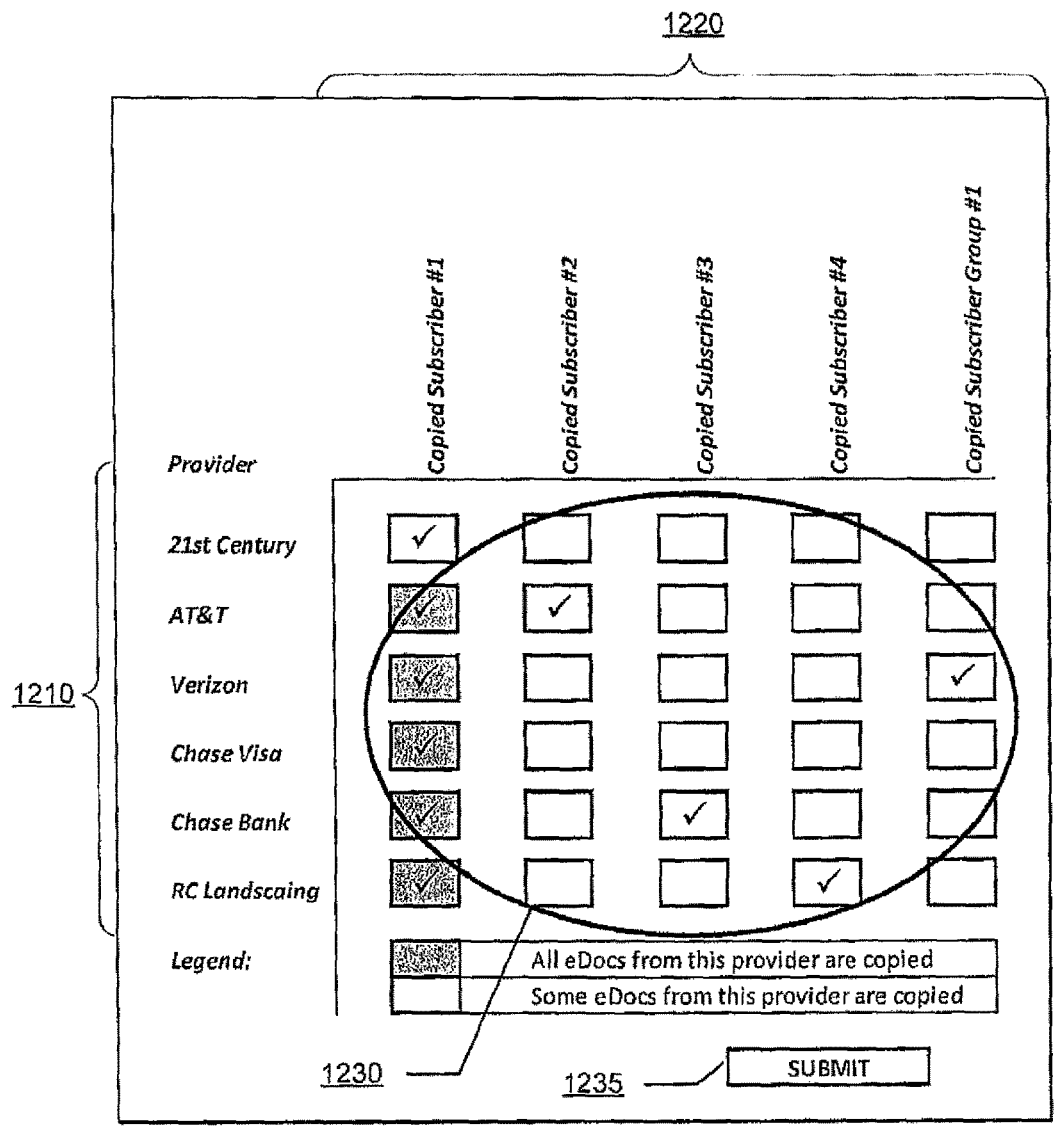
Figure 12B:
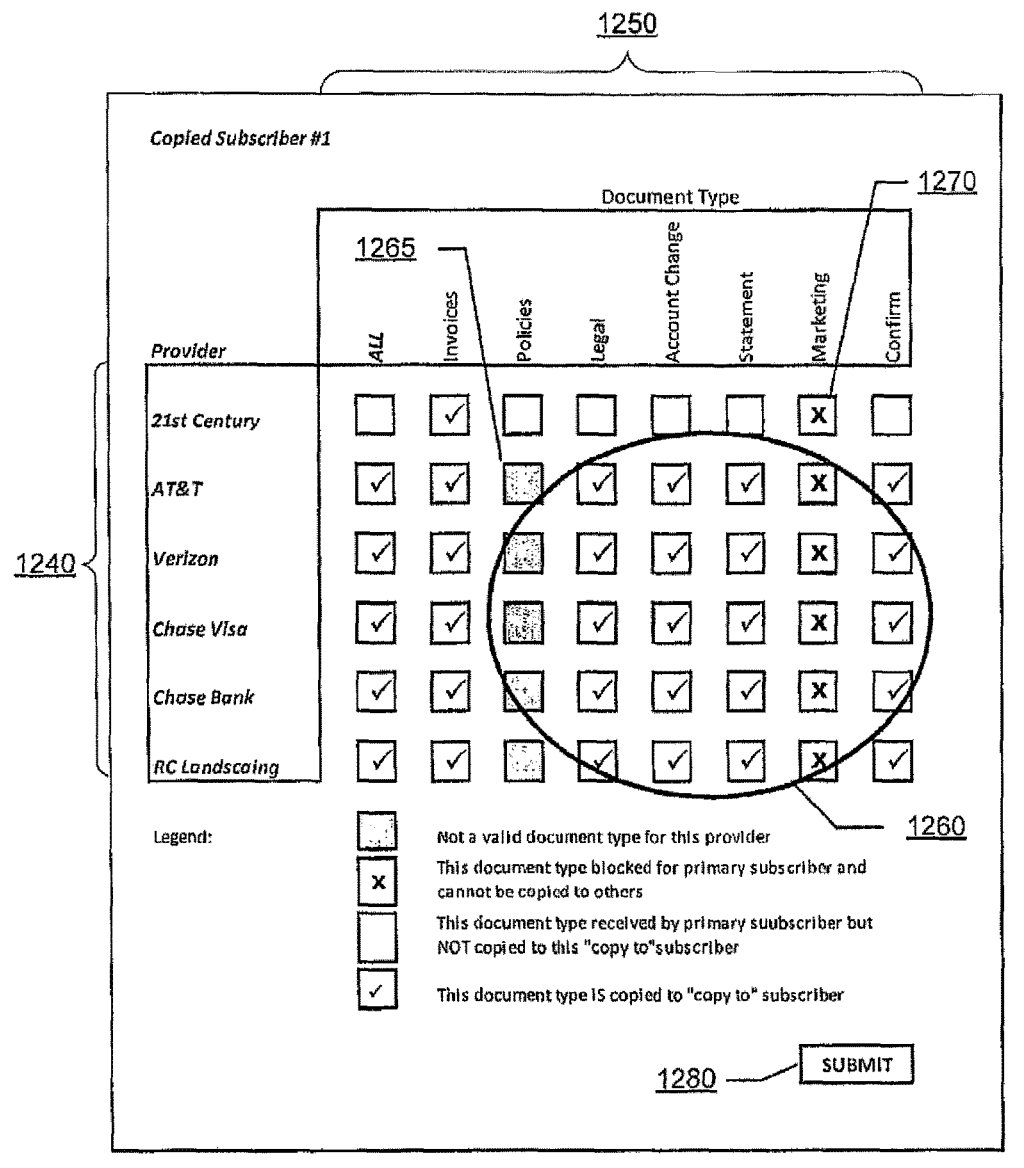

FIGS. 12A and 12B describe the user interface utilized by EM Subscribers to establish and modify copy/forward subscription relationships within the ECMDN.

FIG. 13 is a high level description of the data structure utilized to manage copy/forward functionality within the ECMDN.

FIG. 13A is a high level description of the data structure utilized to manage a multitude of private encryption keys within the EM Subscriber's eDoc Reader.

FIG. 14A is a high level description of a typical public metadata template utilized in the operation of the ECMDN.

FIG. 14B is a high level description of a typical private metadata template utilized in the operation of the ECMDN.

Figure 15:
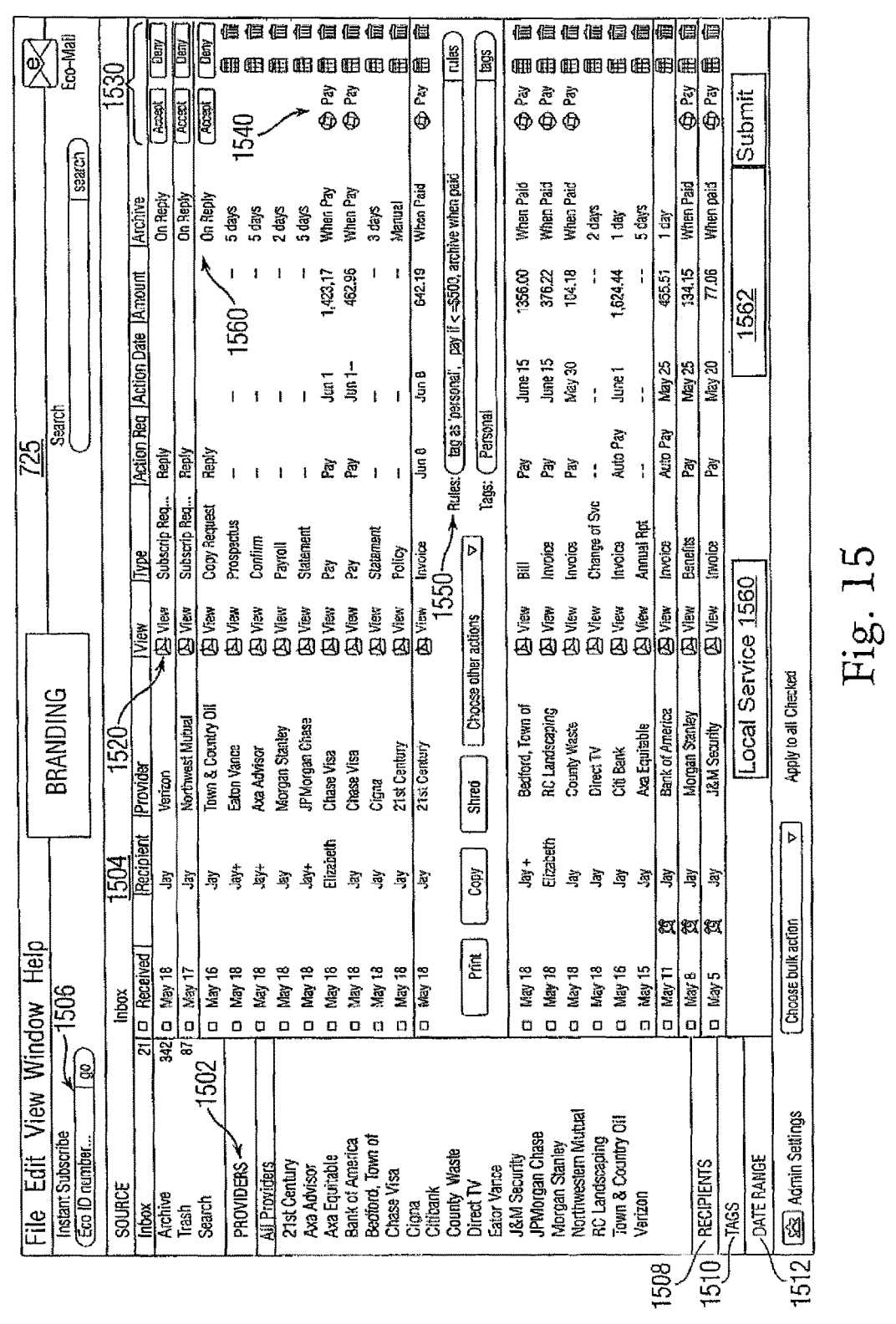

FIG. 15 depicts a typical embodiment of the EM Subscriber's eDoc Reader user interface.

Figure 16:
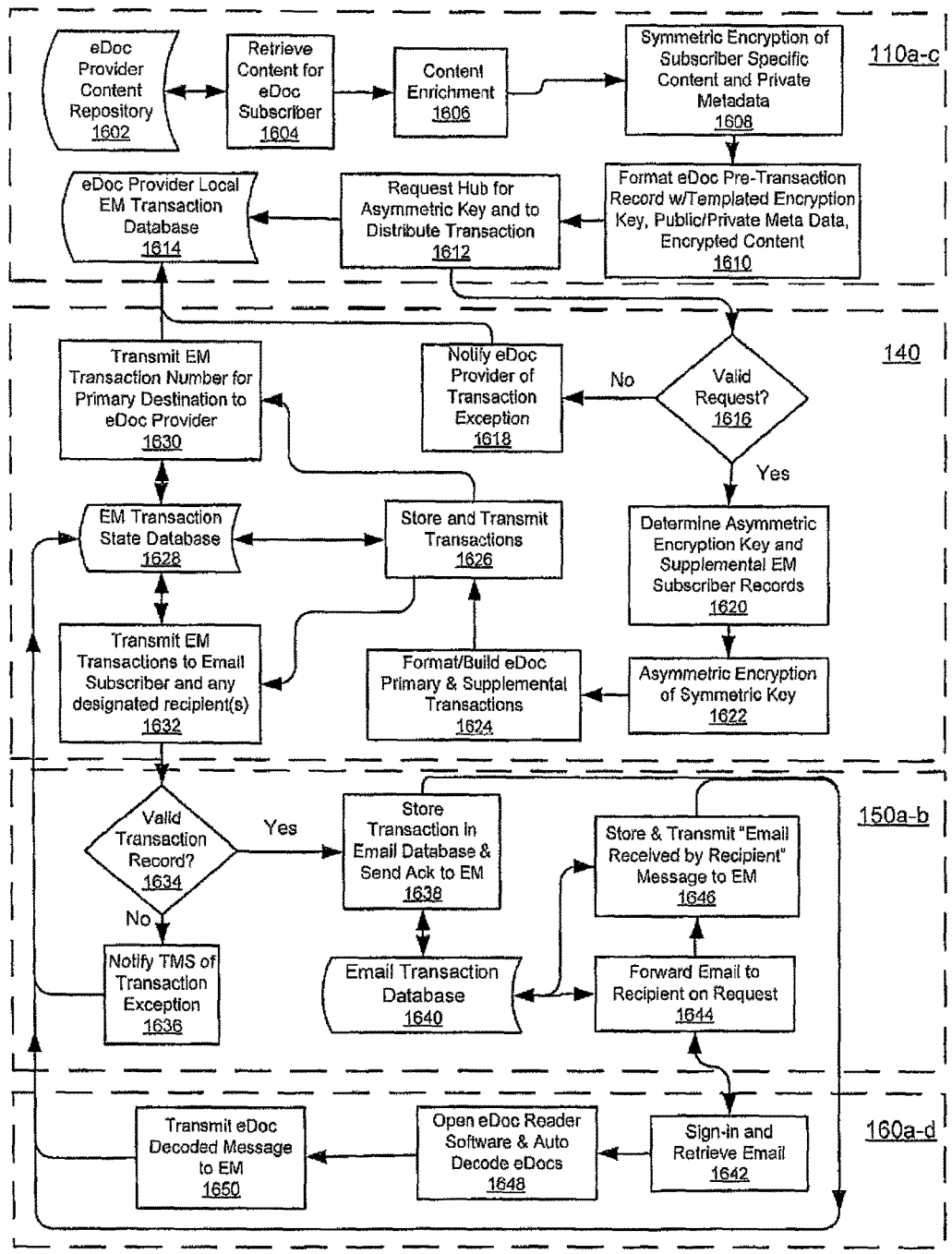

FIG. 16 depicts a simplified flow diagram of the electronic commercial mail document transaction creation and distribution operation of the preset invention.

Figure 16A:
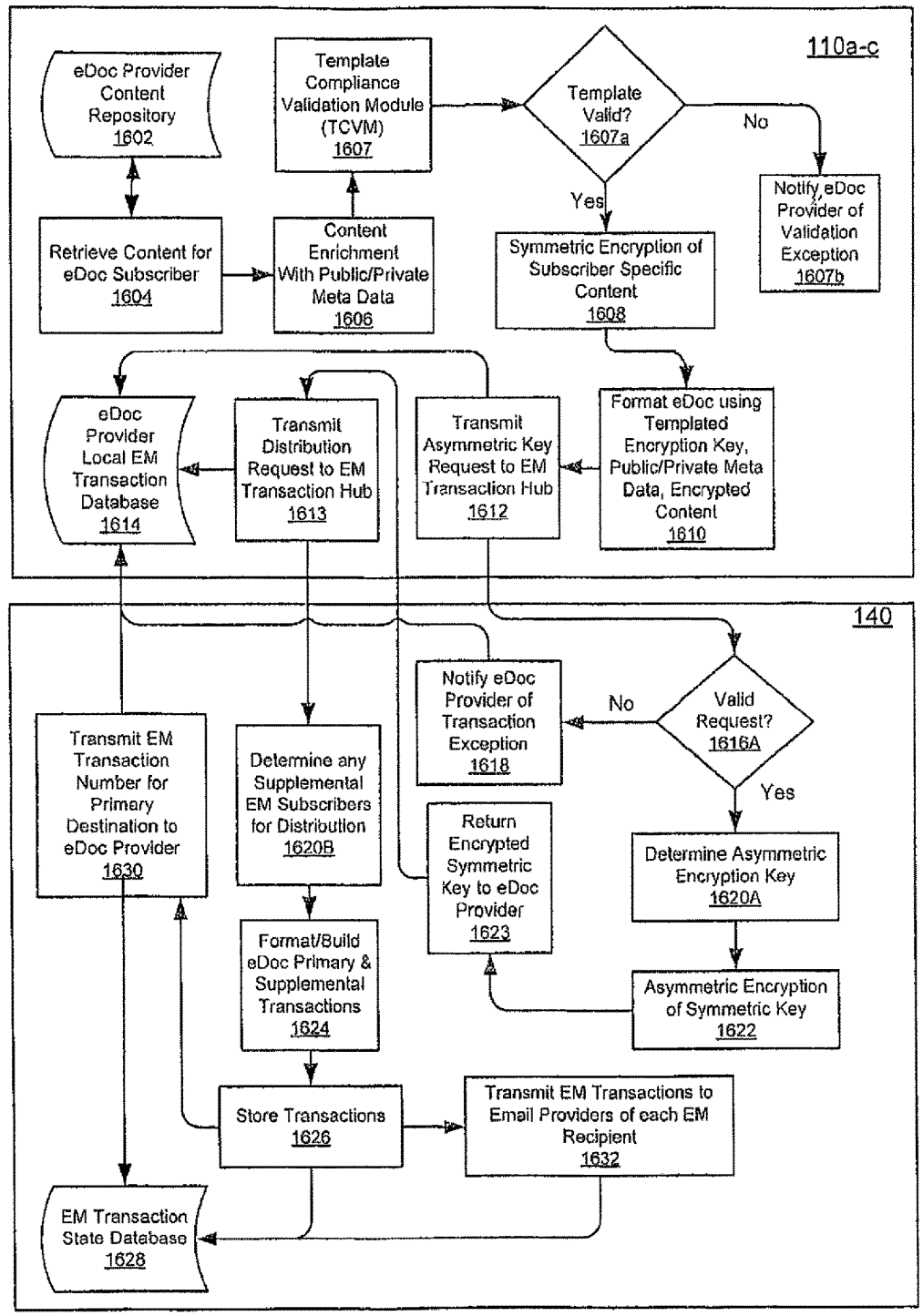

FIG. 16A depicts an alternative flow as between the content provider and the EM system prior to distribution of an eDoc to a subscriber or any supplemental recipient designated by the subscriber.

Figure 17:
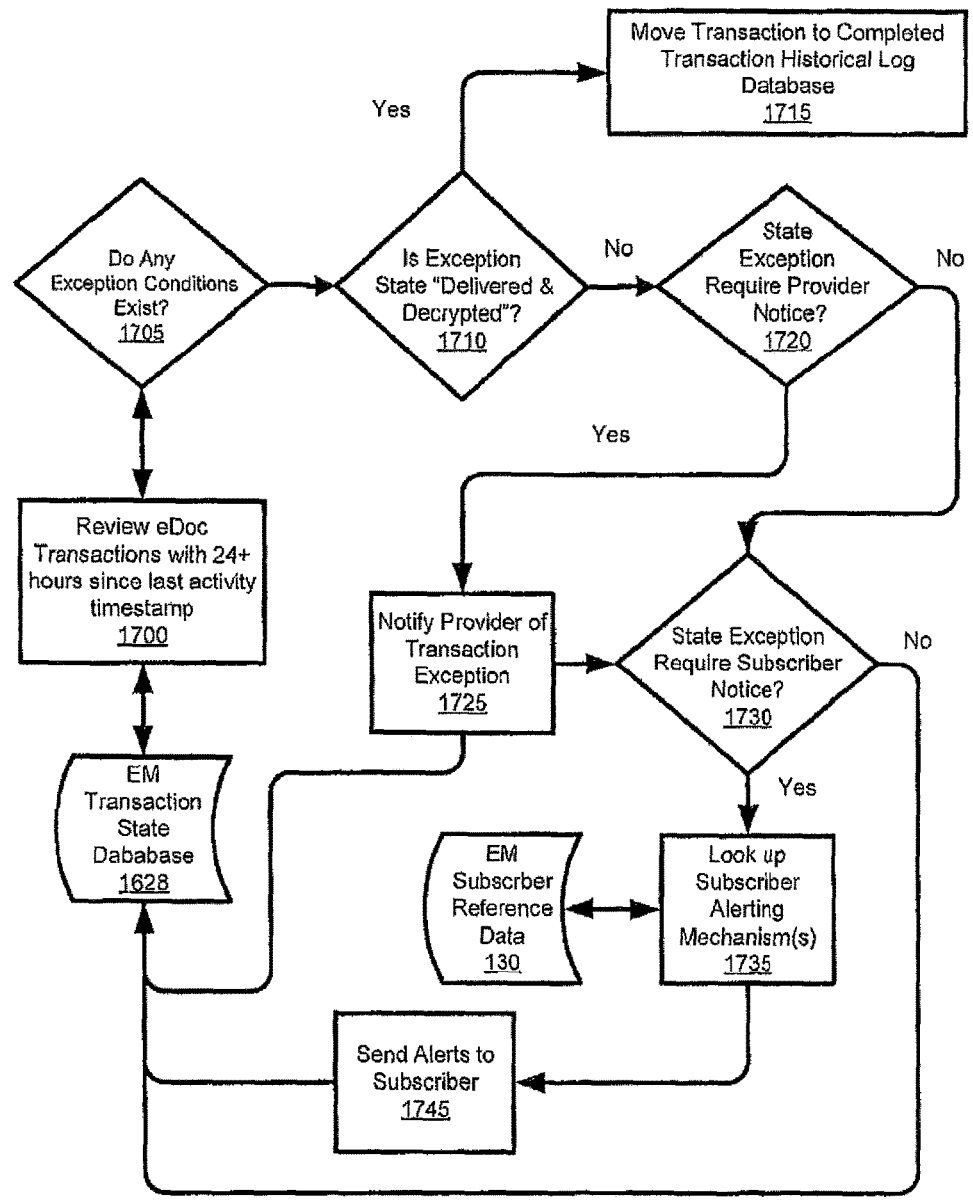

FIG. 17 depicts a simplified flow diagram of the electronic commercial mail document delivery exception and subscriber alerting operation of the preset invention.

Figure 18:
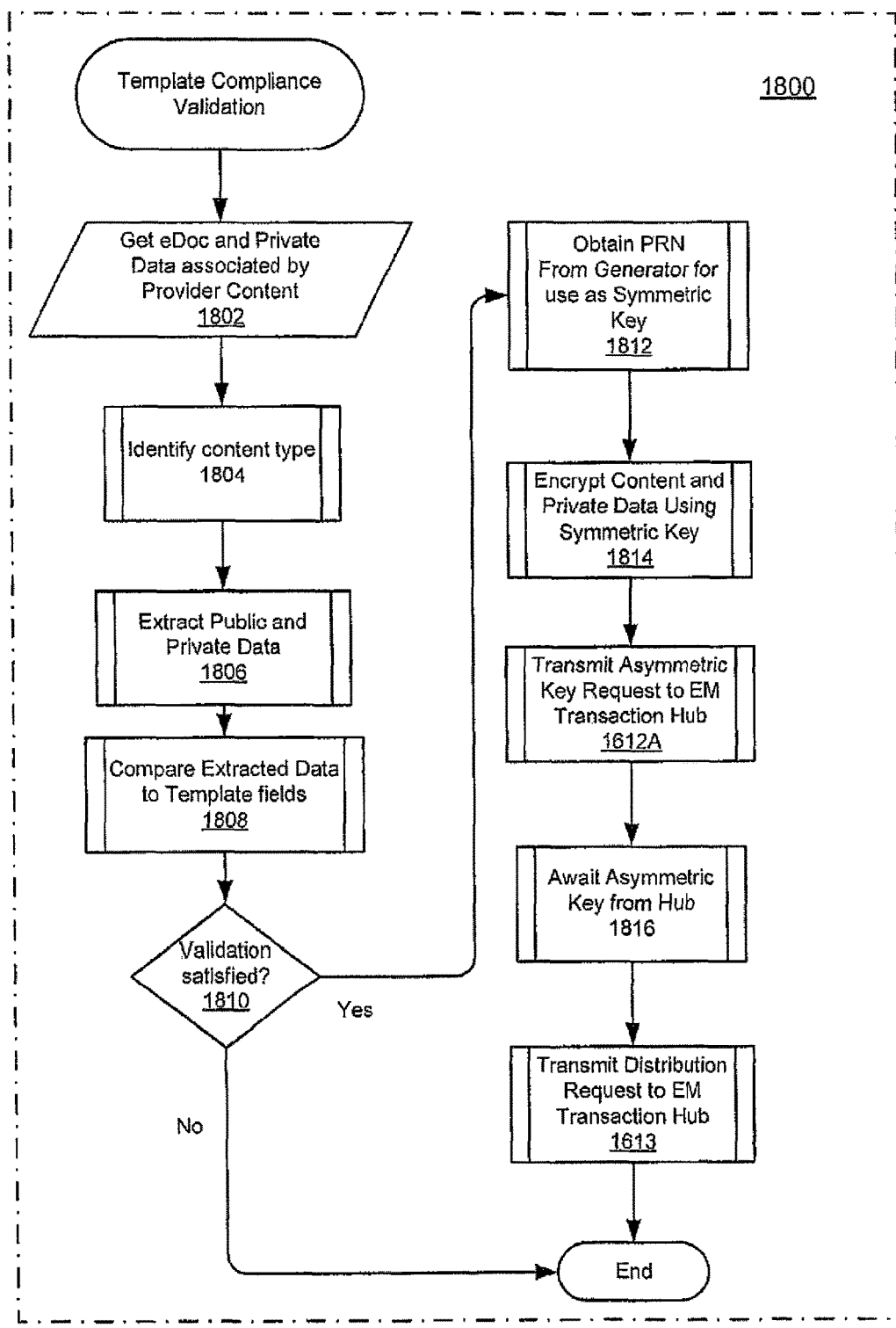

FIG. 18 depicts a validation engine that can be used in connection with certain embodiments of the invention to confirm compliance by individual content providers with standardized templates used by all participants in the EM system for any given content type.

Figure 19:
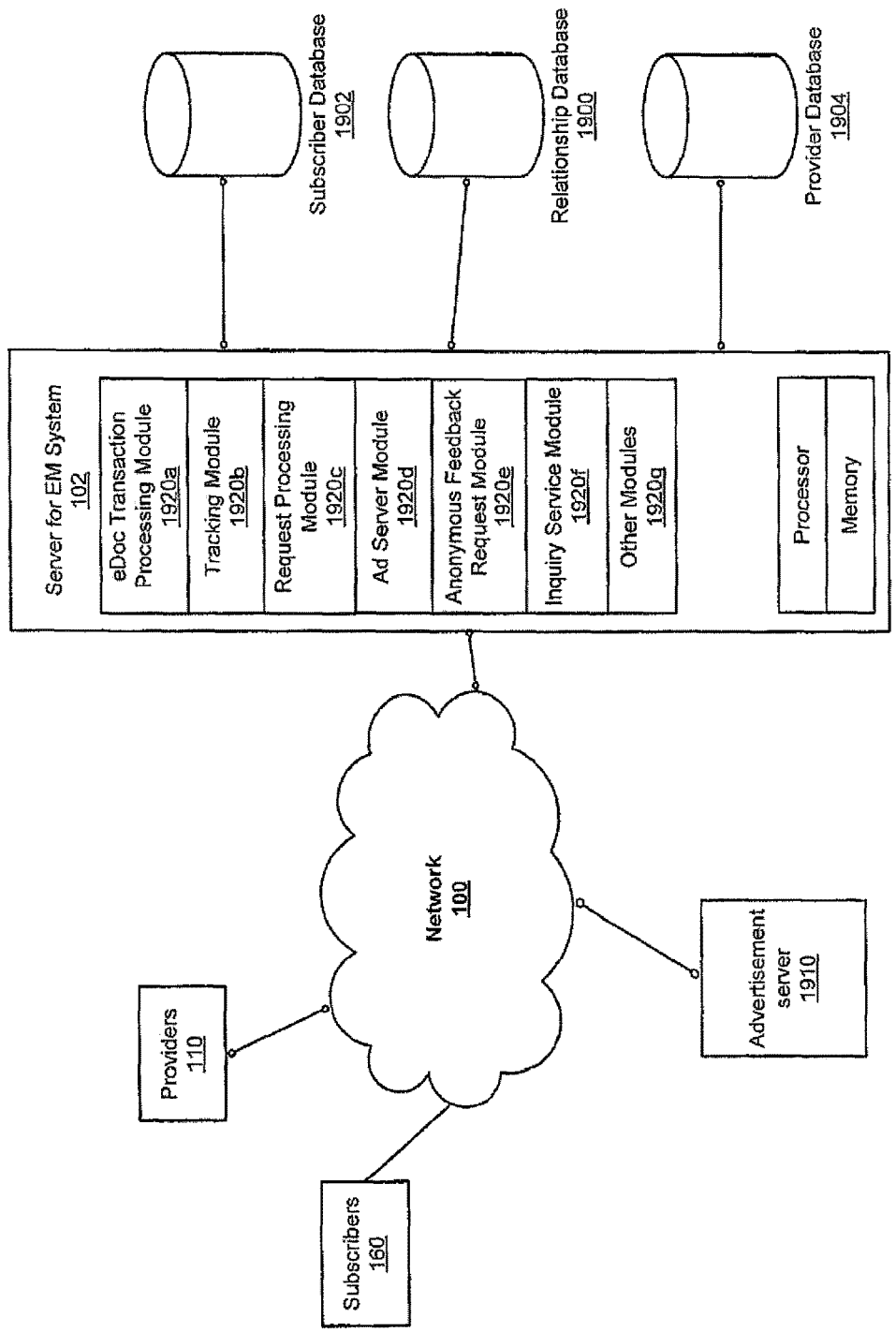

FIG. 19 depicts a network diagram including a server having a set of modules that cooperate to provide local-ad service functionality.

Figure 20:
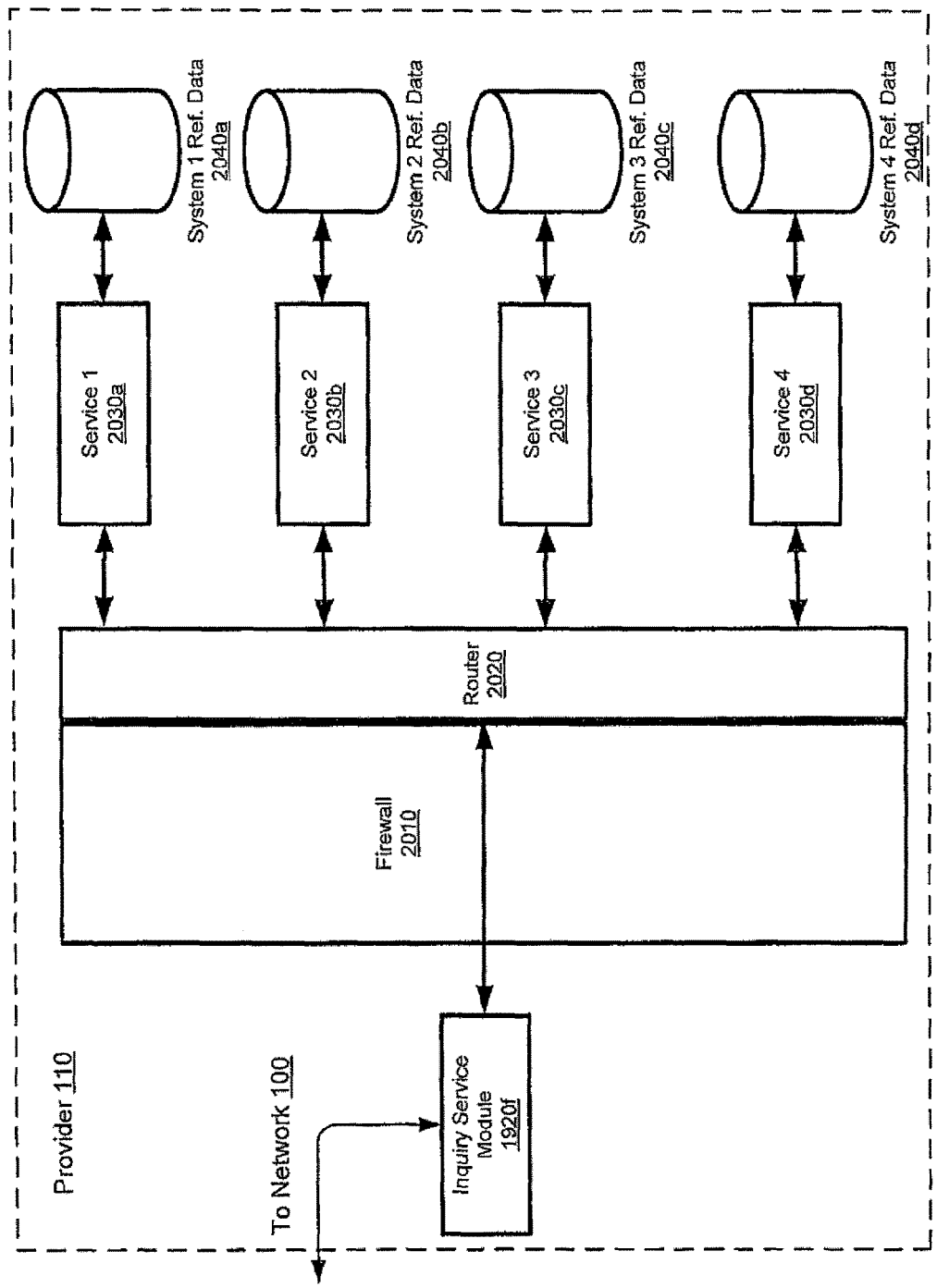

FIG. 20 depicts a schematic diagram showing an inquiry service module included in a machine associated with a provider and its relationship to provider equipment.

DETAILED DESCRIPTION OF CERTAIN EMBODIMENTS OF THE INVENTION

By way of overview and introduction, a system and method in accordance with one or more aspects of the invention is configured to provide dual security measures and metadata that enable controlled handling of messages through the auspices of a secure electronic message portal. By layering security mechanisms and distinguishing metadata by layer, the system provides content security between the provider of a document and its recipient while shielding the content of the document using the content security mechanism. This provides distribution privacy to the recipient. In a preferred implementation, an initial, symmetrically encrypted content security layer limits access to the content of a message conveyed through the portal to only those users that are designated recipients. A separate and additional (preferably) asymmetrically encrypted layer of security provides privacy to the user. In particular, authorized messages from the electronic message portal include the additional key which is known to the portal and the user. This second layer of security enables the user's reader to differentiate authorized messages from unauthorized messages, and, as such, enables unauthorized messages/transactions to be blocked. This same security can be used in connection with automated alerts and redistribution of messages at the instruction of the original recipient, without disclosing this information to the original sender (or any other unauthorized party).

The metadata associated with each layer in the security arrangement just described is paired to that layer so as to facilitate routing at the public level and automated document management and the private level. In one preferred implementation, a schema is provided which can be read by modules associated with end user devices (that is, machines under the control of subscribers, providers, financial intermediaries, and so on). The schema can comprise code, information, or both, that is embedded in the document that has been encrypted by the aforementioned security layers, and which cooperates with a module executing on a machine of an end user to identify the document as being compatible with a system constructed in accordance with the invention and to provide information concerning at least one of routing, scheduling, and handling of the document once it is decrypted of its security layers.

An exemplary embodiment is described which implements several aspects of the invention. The invention is capable of other implementations than as embodied in the particular embodiments illustrated herein. The embodiments described herein, however, provide an expedient for enabling a person of ordinary skill in the art to make and use the invention.

Figure 1:
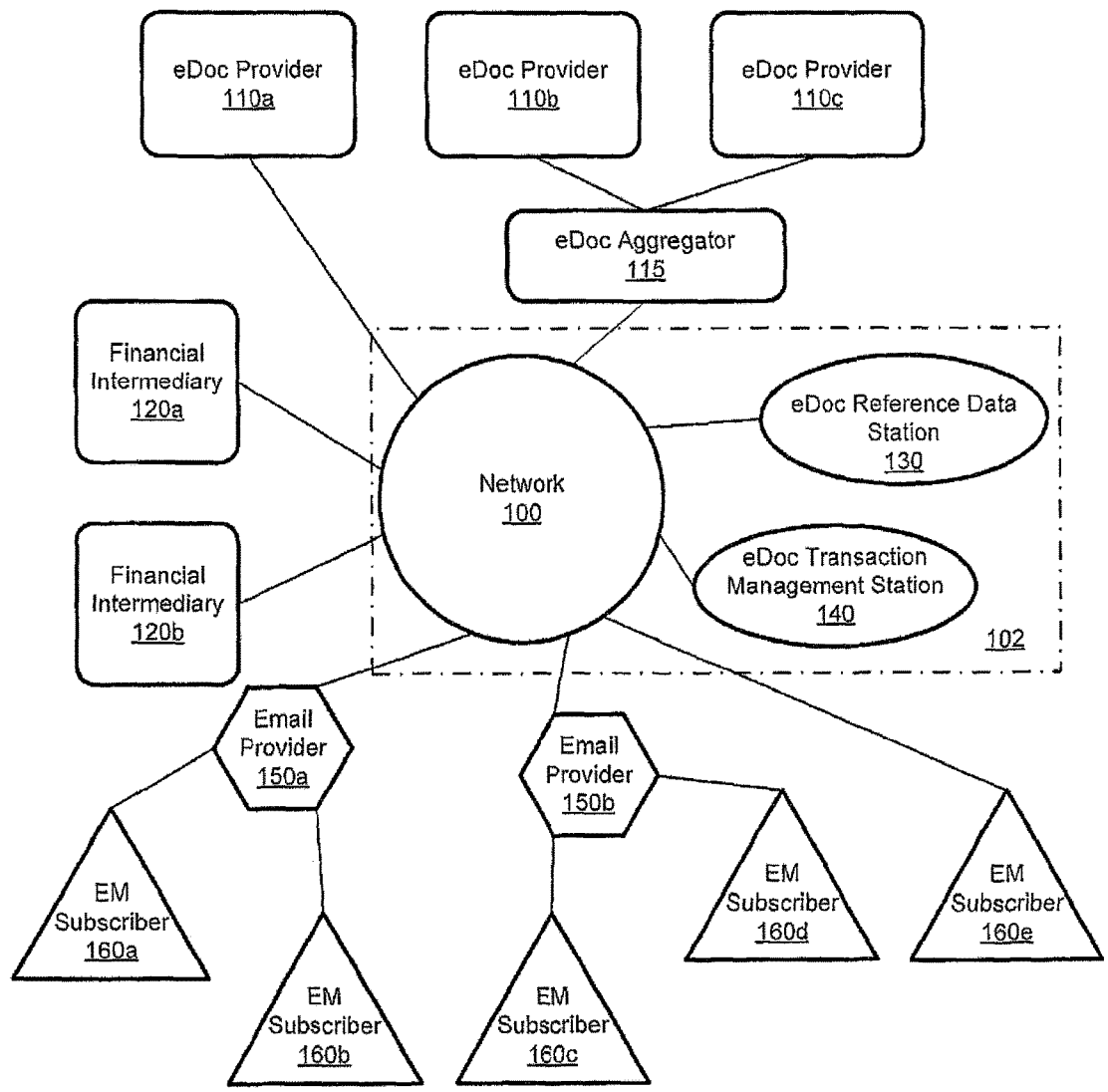

Turning then to FIG. 1, a simplified view of an electronic communications network 100 is illustrated. The network can comprise both public and private segments. For instance, the network segments can include one or more of the following: the Internet, dedicated communications circuits, wide area networks or other types of communications networks. The network 100 is utilized to collect and distribute referential data that is used, in accordance with a salient aspect of the invention, in order to structure and control the flow of content and transactional records that contain the actual content that is to be distributed between the entities and devices in accordance with the broad teachings of the present invention. Associated with the communications network 100 is an Eco Mail ("EM") system 102 that can include one or more machines (e.g., a computer or server having a processor and memory) that process eDoc transactions in support of eDoc delivery between content providers and subscribers to the Eco Mail system. Each machine, computer, or server described herein includes a processor that executes code to configure the processor into a special purpose machine suitable for implementing the functionalities described.

More particularly, the users include eDoc Providers 110a-c, Financial Intermediaries 120a-b, eDoc Reference Data Station 130, eDoc Transaction Management Station 140, Email Providers 150a-b, and EM Subscribers 160a-e. These are discussed in turn. Also, the EM system 102 including each of its modules, stations, and machines can further have data storage local to the machines that support its operations or the data can be stored in the cloud that includes the network 100. As will be appreciated, depending on the implementation, a subset of the users may be present in a given implementation. For instance, some eDoc providers (e.g., banks) serve as a financial intermediary and so users 120a-b may not exist in a given implementation, and the EM system 102 can communicate with various EM subscribers directly, such as subscriber 160e, without utilizing an Email provider 150a-b.

eDoc Providers (hereinafter, "Providers") 110a-c comprise (1) large commercial institutions who interact directly with the electronic commercial mail distribution network (ECMDN), (2) moderate sized commercial institutions that may act through an intermediary eDoc Aggregator 115, to provide specific services related to formatting content and connecting to the ECMDN, and (3) small commercial entities that outsource content production and management to a third party that creates and maintains source content and provides services to format such content and connect and transmit the formatted content to the EMCDN.

Financial Intermediaries 120a-b comprise those financial institutions and financial service providers that provide financial management software and/or services to EM Subscribers 160a-e. As can be appreciated, in some instances, among the large commercial institutions 110a are banks that provide both content as an eDoc provider and serve as a financial intermediary.

The eDoc Reference Data Station ("RDS") 130 comprises a centralized hub that can be accessed by all of the participants of the system. As such, the RDS 130 can be and preferably is used for the purposes of: controlling registration as a member of the ECMDN, receiving data that uniquely identifies each participant, searching for other members of the network, and creating subscription relationships between and among members to facilitate, control, secure content communication and management, and establish and maintain alerting rules and delivery mechanisms. The code for the RDS 130 and its functionality are described in further detail in relation to FIG. 5.

The eDoc Transaction Management Station ("TMS") 140 also can comprise a centralized hub having a processor and code executing therein which is operative to format, validate, secure, transmit, and track all transactions within the embodied ECMDN. In one embodiment, code executes locally within a processor of the hub to provide this functionality. The code for the TMS 140 and its functionality are described in further detail in relation to FIG. 6.

The RDS 130 and the TMS 140 each have communication facilities (e.g., a network interface card and respective communications modules) to support communications therebetween and with other nodes on the network 100. Stations 130, 140 communicate with each other, for example, in order to insure that a valid subscription exists for each requested eDoc Transaction, to identify subscriber routing, to identify copy and forward requirements and addresses for each transaction, and to determine the correct public encryption key for each transaction.

The term "email provider," as used herein includes entities arranged to manage and provide electronic records to subscribers after they log-in to retrieve records associated with them, in the same way as many other sites manage records for subscribers. Thus, while email Providers 150a-b can comprise the conventional, commercial provider of e-mail services (e.g.: AOL mail made available by America Online, Inc.; gMail made available by Google, Inc., etc.), they also can comprise entities that are specially configured to support the eDoc transactions described herein, namely, the Eco Mail system 102, as is apparent from this description. As such, the functionality of the Email Providers should be understood as being a feature of and part of the EM system 102 itself in certain implementations. Thus, by way of example, embodiments of the invention can achieve the goal of communicating records between vendors and subscribers without utilizing conventional email providers or email protocol. In such embodiments, the ECMDN can be a private network comprised of all registered Providers, Subscribers and Financial Intermediaries, and such members can directly interface with the TMS and the RDS to deposit or withdraw relevant messages. In such implementations, email networks are not required for members of the EM system to exchange messages.

EM Subscribers 160a-e are individuals or other entities who have registered with the EMCDN in order to receive and manage commercial content through the system of the present invention.

It should be understood that all communications among the participants that utilize the system can be performed in a conventional manner with existing protocols, such as HTTP or HTTPS or FTP, as a few non-limiting examples.

Figure 2:
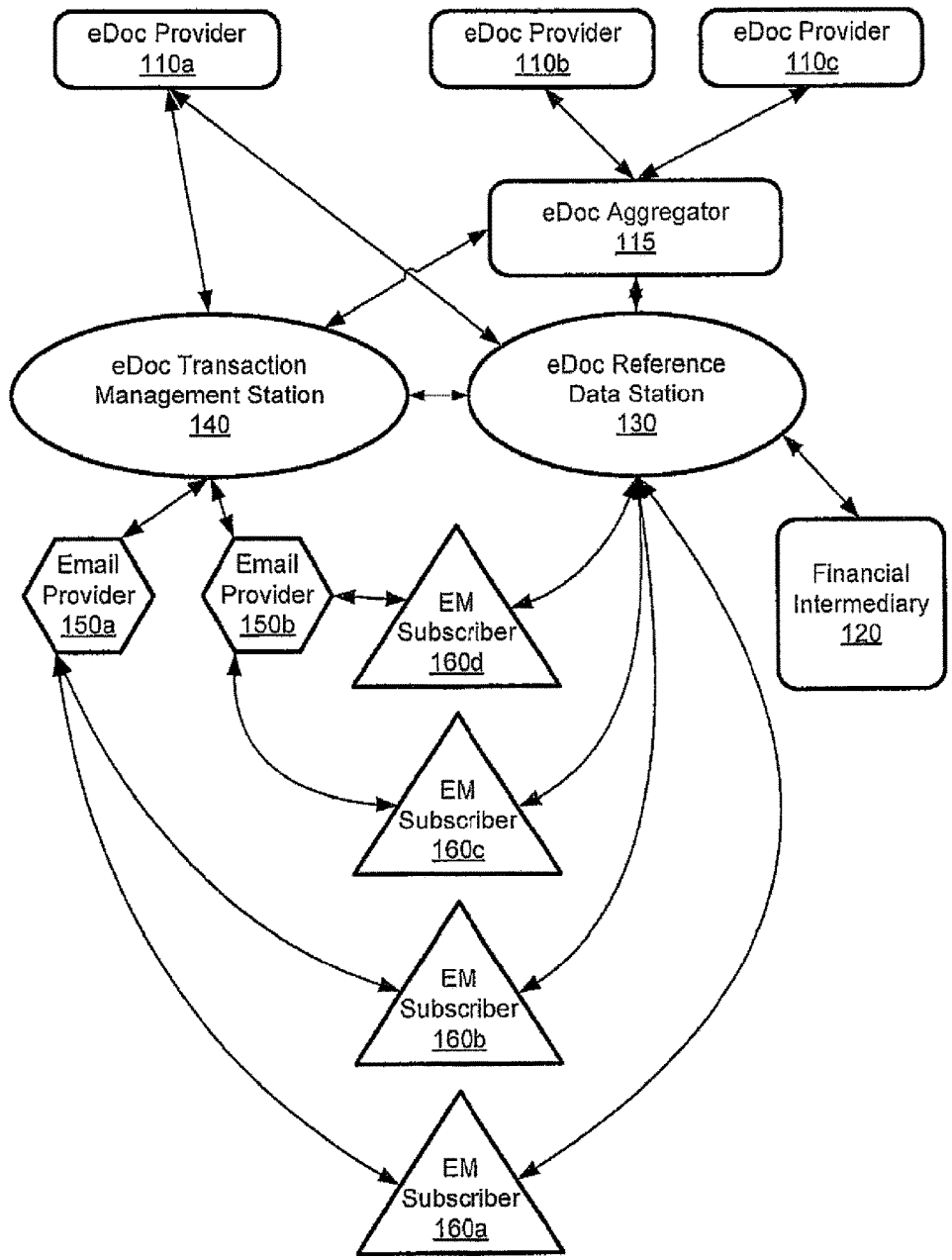

FIG. 2 is a functional block diagram of the ECMDN depicted in FIG. 1 showing interaction between and among its constituent components. As detailed in FIG. 2, communications take place through an electronic network which may be private or public. Providers 110a-c communicate directly or, through an eDoc aggregator 115, with the RDS 130 and the eDoc TMS 140.

The Providers identify themselves to the eDoc RDS 130 as members of the ECMDN and submit search requests and retrieve information about customers associated with them who are EM Subscribers 160a-e of the ECMDN. In addition, the Providers can retrieve templates and information about the data and formatting standards that are required for particular eDoc transactions. Such formatting standards can be referred to as a schema, or, more particularly, an Eco-Mail schema (EM schema)

Communications by the Providers 110a-c with the TMS 140 are made in order to initiate and track eDoc transactions with EM Subscribers 160a-e who have previously been identified as customers and who have subscribed to receive communications in the form of eDocs from specific Providers 110a-c. Tracking of transactions can include messages relating through the TS concerning a subscriber's interaction with a particular eDoc.

On the other hand, EM Subscribers 160a-e can communicate directly with the RDS 130 to provide information about themselves as members of the ECMDN, to search, identify and subscribe to receive eDoc communications from Providers 110a-c. EM Subscribers can also manage supplemental eDoc delivery of transactions that are addressed to them, including copying other subscribers on certain types of content and forwarding content to a subscriber who has assumed fiduciary responsibility for the forwarding subscriber.

Communications between EM Subscribers and the RDS 130 typically include at least one segment over a public network such as the Internet. Communications between Providers and the RDS 130 can be conducted the same way, or may transpire over a VPN or other private connection.

A Financial Intermediary 120 also can communicate directly with the RDS 130 in order to obtain and reconcile referential electronic payment delivery information that has been provided by the Providers 110a-c. Email Providers 150a-b communicate with the TMS 140 to receive, acknowledge, deliver and confirm eDoc transactions that are to be delivered to EM Subscribers 160a-d that are among the Provider's clients. As noted, the EM system 102 can communicate with various EM subscribers directly, as in situations in which the subscriber is a client of the EM system 102. In that case, communications are between subscribers and the TMS 140 of the EM system 102.

Figure 3:
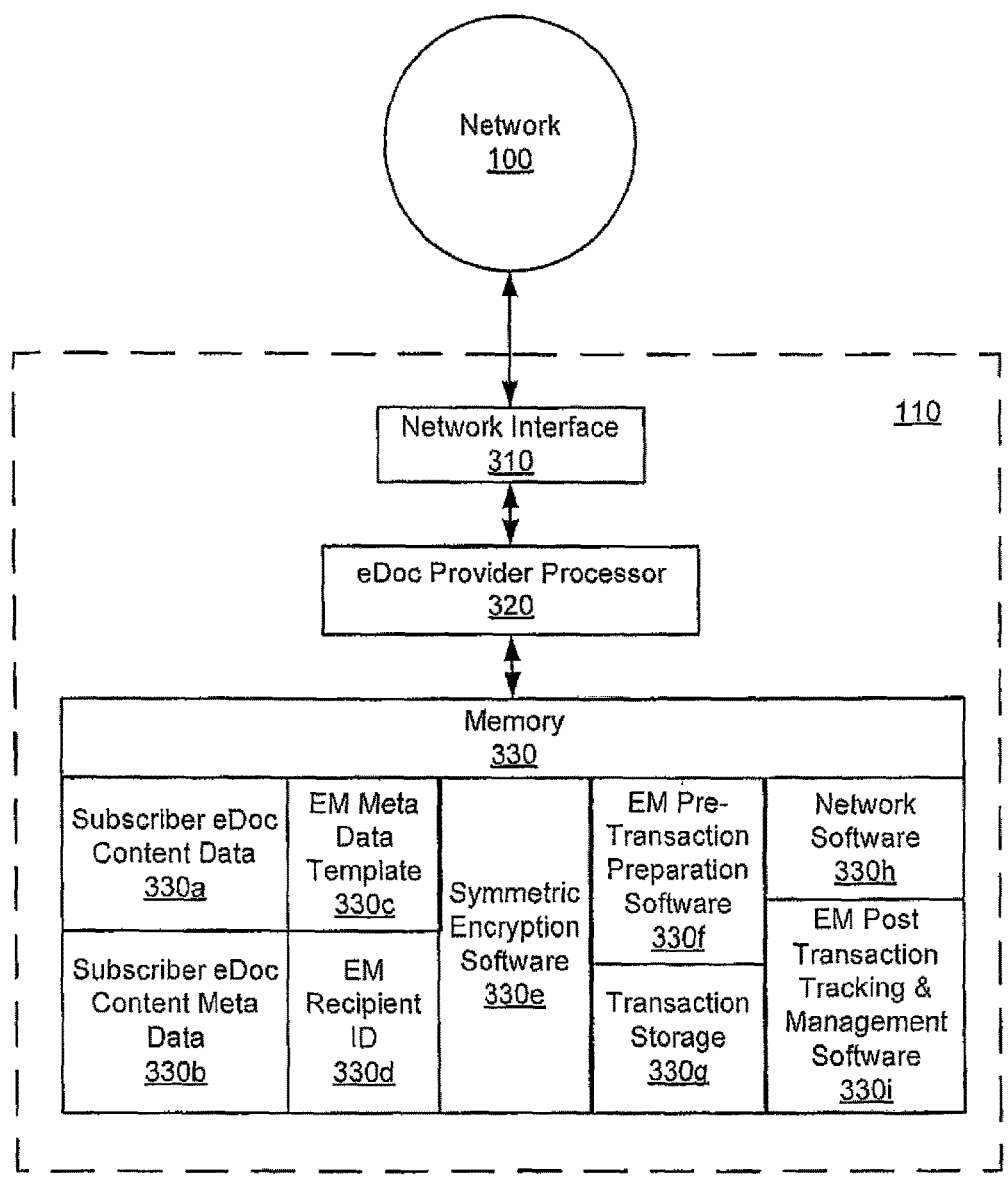

With reference now to FIG. 3, the major components of an eDoc Provider station 110 are illustrated. A network interface card 310 connects the station to the network 100 and supports bidirectional communications. A processor 320 and a memory 330 operate in support of a set of modules or code that is configured to provide the requisite functionality described hereinafter. As will be appreciated, the station 110 can comprise a one or more computing machines and can be configured as a network server or servers. It should be appreciated as well that an embodiment of the invention can have certain functions performed by the eDoc Aggregator 115 rather than by the eDoc Provider station 110, and in that case the code or hardware can be included in that machine instead.

The memory 330 stores the source content of a Provider that is to be converted into an eDoc. The memory can have virtual or physical partitions, and source content can be stored, for example, in area 330a. Metadata concerning the source content can be stored in another partition, such as area 330b and used by the ECMDN to create a valid eDoc Transaction. The metadata specifications can vary based on many factors such as industry, industry sub-category, and document type. In part, the metadata includes subscriber eDoc Content Metadata such as Provider id, subscriber id, industry, industry sub-category, document type, customer account number, response required indicator, response required date, period start date, period end date, total amount due, and minimum amount due. The metadata can be an extensible format and vary as a function of document type, industry and other factors, as noted. As such, an EM schema can include templates for metadata that vary with the factors noted previously.

Each Provider ascertains the requirements for the source content conversion by communicating with the RDS 130 to identify and retrieve the appropriate EM Metadata Template. The template can be stored in another partition of the memory of the station 110, such as area 330c. EM Metadata Templates are described in more detail in FIG. 14. The memory 330 also stores the EM Recipient's GUID, such as in area 330d. The EM Recipient GUID is ascertained from valid subscription relationships by communications between the eDoc Provider station 110 and the RDS 130.

The station 110 also can include code that is operative to manipulate the data in memory areas 330a-d so as to provide standardized formatting and eDoc security features before a transaction is sent to the ECMDN. The code can be stored within the station, such as within portions of the memory 330 (as illustrated), or within a storage device that is in communication with the station and is accessible to the processor 320. There are four core code-portions that are preferably implemented as software. The code can comprise one or more programs or libraries that, when executed, cause the station 110 to have the functionality described immediately above.

One program code portion comprises Symmetric Encryption Software 330e which encrypts the source content in a manner that can be decrypted with the same key used for encryption. Another code portion comprises EM Pre-Transaction Preparation Software 330f which can assemble, format and submit to the ECMDN the encrypted Subscriber eDoc Content Data, the symmetric encryption key utilized to encrypt the Subscriber eDoc Content Data, the Subscriber eDoc Content Metadata, and the eDoc Provider's unique internal transaction key. Alternatively, the EM Pre-Transaction Software 330f can be configured to generate a symmetric encryption key upon successful validation of required formatting and metadata and to request from the TMS 140 an asymmetrically encrypted version of the symmetric encryption key as further described in FIG. 16A.

Additionally, the EM Pre-Transaction Software can communicate with the TMS 140 in order to have the content formatted, validated (in implementations that require this action), secured, transmitted, and tracked by the TMS 140 as it moves through the EM system. Another program code portion comprises Network Software 330h which handles communication of data to and from the network 100. Another program code portions comprises EM Post Transaction Tracking & Management Software 330i which validates that all transactions submitted to the ECMDN are properly processed, and which, upon determining that a transaction may not have been received or processed correctly by the ECMDN, re-initializes such transactions. A Transaction Storage area of the memory, such as area 330g, can be utilized to maintain a log of the transactions submitted to the ECMDN and their current state.

Figure 4:
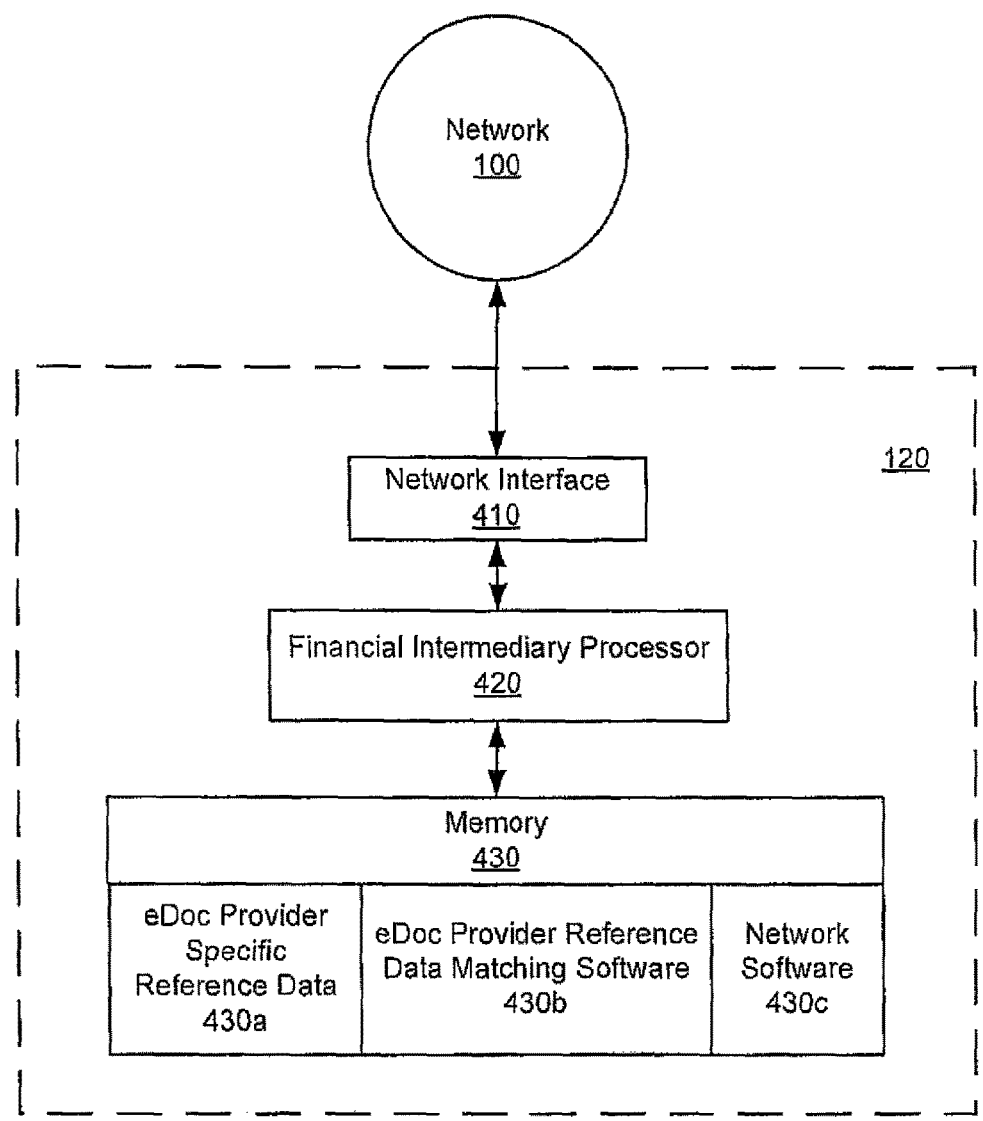

FIG. 4 depicts the components of a Financial Intermediary station 120, illustrated as a single machine though the invention is not so limited. A NIC 410 provides network interface communication to the network 100 in support of bidirectional communication. A local processor 420 and a memory 430 are used to execute program portions, preferably in the form of software, to cause the station 120 to perform the matching functions described below. The memory 430 can have virtual or physical partitions so as to store eDoc Provider Specific Reference Data in a portion 430a. This data can be derived, initially, from systems external to the ECMDN and can come from internal client-relationship data of the financial intermediary or from data entered by users of the financial intermediaries' existing systems. The reference data is such that it contains sufficient attributes to allow execution of the eDoc Provider Reference Matching Software 430b to search for and uniquely identify Providers from the RDS 130. Apart from that requirement, the reference data can take on a variety of forms. Execution of the software 430b in the processor of the station 130, if successful, has a unique match to an eDoc Provider, and the eDoc Provider Specific Reference Data 430a is thereafter updated by the software 430b to include the Provider ECMDN's GUID and electronic payment delivery information. Memory 430 also contains Network Software 430c which handles communication to and from the network 100.

Figure 5:
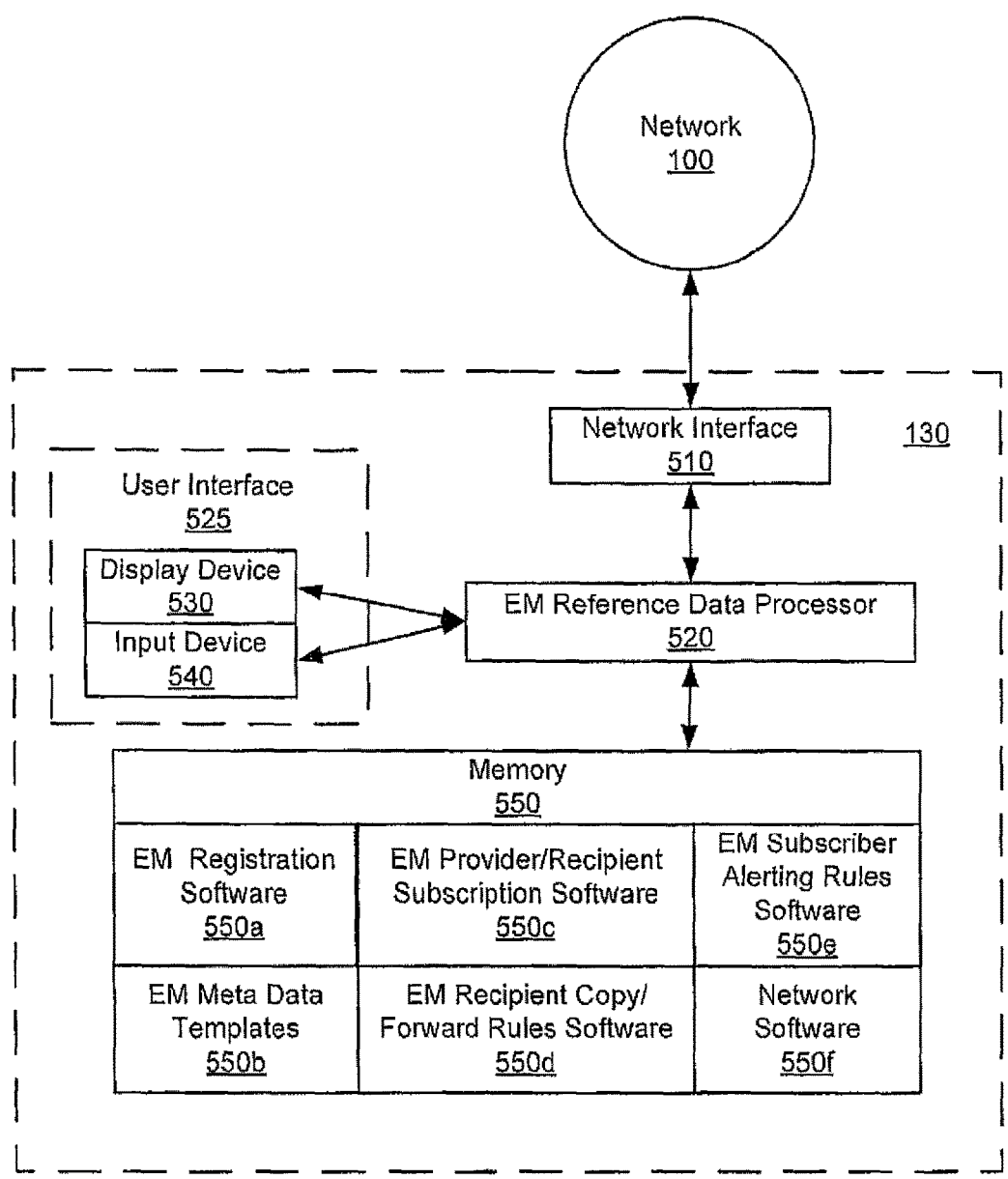

The Reference Data Station 130 is described next with regard to FIG. 5. The RDS 130 includes a NIC 510, processor 520 and memory 550, of the type as previously described. Of pertinence here, the RDS 130 also includes a user interface 525 that includes a presentation through a display device 530 and connectivity to an input device 540. In a preferred embodiment, the display device 530 is a monitor and the input device a keyboard, but the input/output devices can be implemented otherwise so long as they conveys data in a recognizable form to and from a human being. Memory portion 550a stores EM Registration Software which is operative to allow new subscribers and Providers to register themselves with the ECMDN. This program portion collects meaningful data from the user to tie the user's ECMDN identity to physical locations where he or she receives or creates goods, services and/or paper documentation, and also ensures that registrants provide an email address that is within the domain of an Email Provider 150*a-b* that is a participant in the ECMDN so that eDoc transactions can be routed to the EM Subscriber once they are registered. As can be appreciated, since eDoc transactions are managed by the EM system 102, an EM subscriber can access such eDoc transactions once they are registered with the EM system by accessing the EM system through the network 100, e.g., using a conventional Internet connection in substantially the same way that eDoc providers and financial intermediaries access the EM system.

Figure 8:
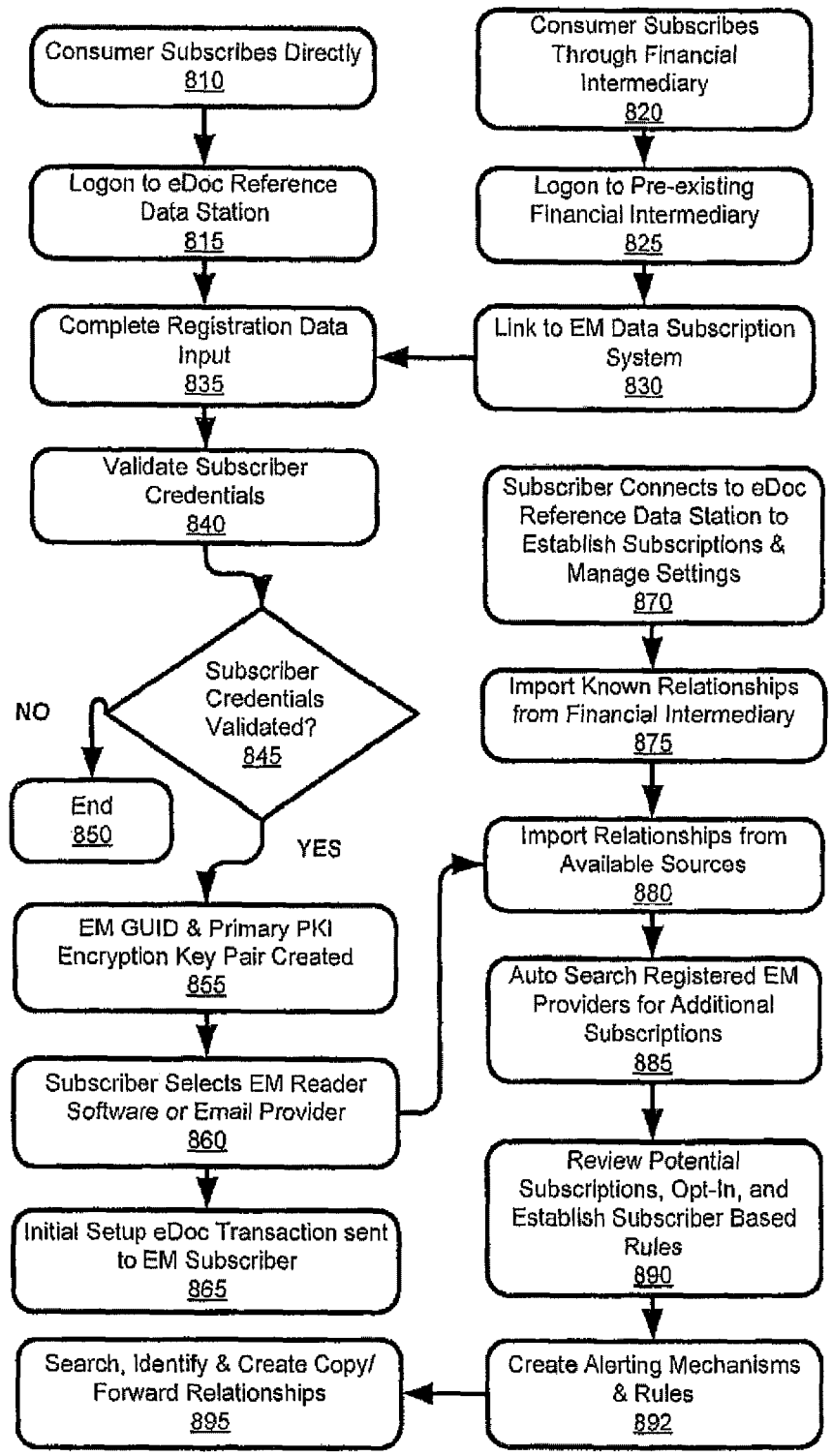
Figure 9:
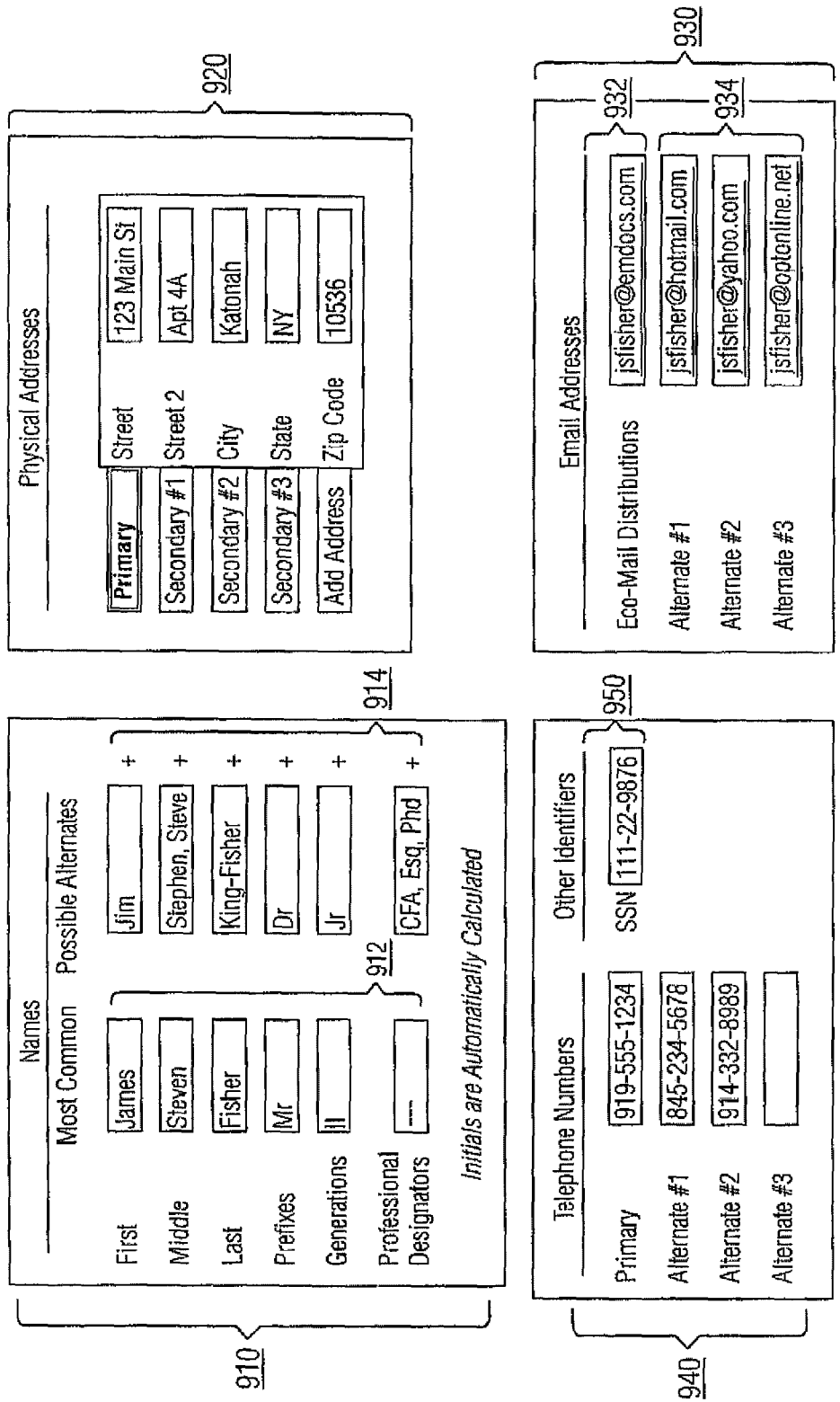
FIG. 9 depicts a recipient subscriber registration screen in accordance with the present invention.
Figure 10:
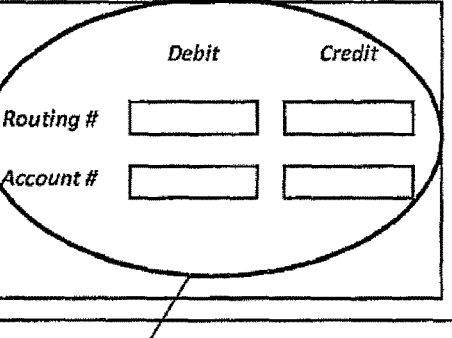
FIG. 10 depicts a provider subscriber registration screen in accordance with the present invention.

Turning briefly to FIG. 8, a high level flow of the initial registration process provides a more detailed depiction of the operation of the EM Registration Software. Also, FIGS. 9-10 depict a user interface portion configured to present a form to a user for data capture and submission to the RDS 130. In part, these figures depict an example of data elements that can be required for registration.

Registrants are also required by the EM Registration Software 550*a* to validate their identity. In one embodiment of the invention, validation can be accomplished by the registrants accessing the software via a trusted source. The trusted source can be a financial intermediary with whom the registrant has already established their identity. Validation can alternatively be achieved via testing against a third-party database. Thus, for example, validation can comprise correct responses to a series of queries posed through the user interface 525 against a known set of data about a registrant from a third-party database, such as a credit bureau.

Memory portion 550*b* contains a multitude of EM Metadata Templates that can be accessed by Providers 110*a-d* to insure that the proper metadata and format requirements for each specific type of eDoc transaction are met. Memory portion 550*c* can have the EM Provider/Recipient Subscription Software. This software allows EM Subscribers to establish and manage a set of subscriptions with various Providers from whom they are willing to accept eDocs. The subscription software further allows EM Subscribers to more granularly control what types of eDocs they are willing to accept and potentially with what frequency. Subscriptions can be generated by automated look-ups against an existing list of physical mail providers, by direct entry of an eDoc Provider GUID, by manual search or as an affirmative response to a proposed subscription by an eDoc Provider. In some instances, a subscription can be based on a the user selecting provider and providing account information to identify a particular account at the provider to which the subscription is to be established. In other instances, a code can be printed on a hard copy of an invoice from a provider that the user can input into the user's machine that is connected to the RDS 130 for processing by the Provider/Recipient Subscription Software. This code combines information concerning the provider and a particular subscriber or subscriber account that the provider can decode and use to match to its records and provide a basis for an authenticated subscriber entry. In still other instances, a code such as just described can be include on a site accessible through the network 100, which, when selected (e.g, clicked on) by the user launches an instant subscription. These are examples of ways that subscriptions can be encouraged using codes that are initiated outside of the RDS 130. Of course, a provider can send an invitation through the EM system 102 to a user to become a subscriber and be able to manage eDocs from that provider. Conversely, the identity of subscribers that enter data in search of particular providers that are not yet available on the EM system 102 can be queued and the provider, once it has joined, can be informed of the queue of subscribers interested in having eDocs provided by that provider. Therefore, in part, the software in memory portion 550*c*, namely, the EM Provider/Recipient Subscription Software, can include a routine that performs such automated look-ups.

Memory portion 550*d* can have the EM Recipient Copy/Forward Rules Software. This software allows subscribers to create and manage relationships with other ECMDN subscribers for the purpose of sharing with or having other subscribers manage some or all of their eDoc transactions. FIGS. 12A and 12B depict one embodiment of the user interface of the copy/forward aspect of the EM Recipient Copy/Forward Rules Software 550*d* and provide greater detail with regard to what data elements are required to enable this functionality. FIG. 13 describes the data structure required to enable the copy/forward functionality, and also provides greater detail of the copy/forward functionality.

Memory area 550*e* contains EM Subscriber Alerting Methods & Rules Software which accepts information from subscribers in connection with how and when they would like to be notified of eDoc transactions that have required actions which need to be performed. This data is utilized by the EM TMS 140 to provide automated notifications and reminders. Such notifications are central to a broad aspect of the invention of managing paperless communications automatically after they have been conveyed to the subscriber. In this regard, a suitably configured interface can capture user alert preferences in relation to each Provider. This can be done in conjunction with the subscriber establishing a relationship with the Providers using the EM system 102, or at a later time. The interface captures data associated with the Provider, such as the number and frequency of any alerts, whether follow-up procedures should be used (e.g., automated phone calls and IVR processing), and the timing of the notifications. For instance, if a particular Provider requires payment 30 days from the transmission of an invoice, the subscriber can set an alert for that Provider of increasing urgency, starting, say, ten days before the due date with a change of the message to yellow, and then to red as the due date draws nearer coupled with a phone call to the subscriber to announce the impending deadline, etc. The appropriate action-required dates can be automatically derived from the "Action Required Indicator" and "Action Required Date" fields of the public metadata associated with any eDoc transaction of a content type having such a field, and a subscriber may be able to add preferred reminders and the like or otherwise modify or create an action-indicator. As such, the template used for the public metadata is exposed to a client-side reader, discussed below, so that regardless of which template is used—among the many that comprise the EM schema, there is information that can be used for active management of the eDocs that are received. Memory 550 also contains Network Software in area 550*f* to handle communication of data to and from the network 100.

Figure 6:
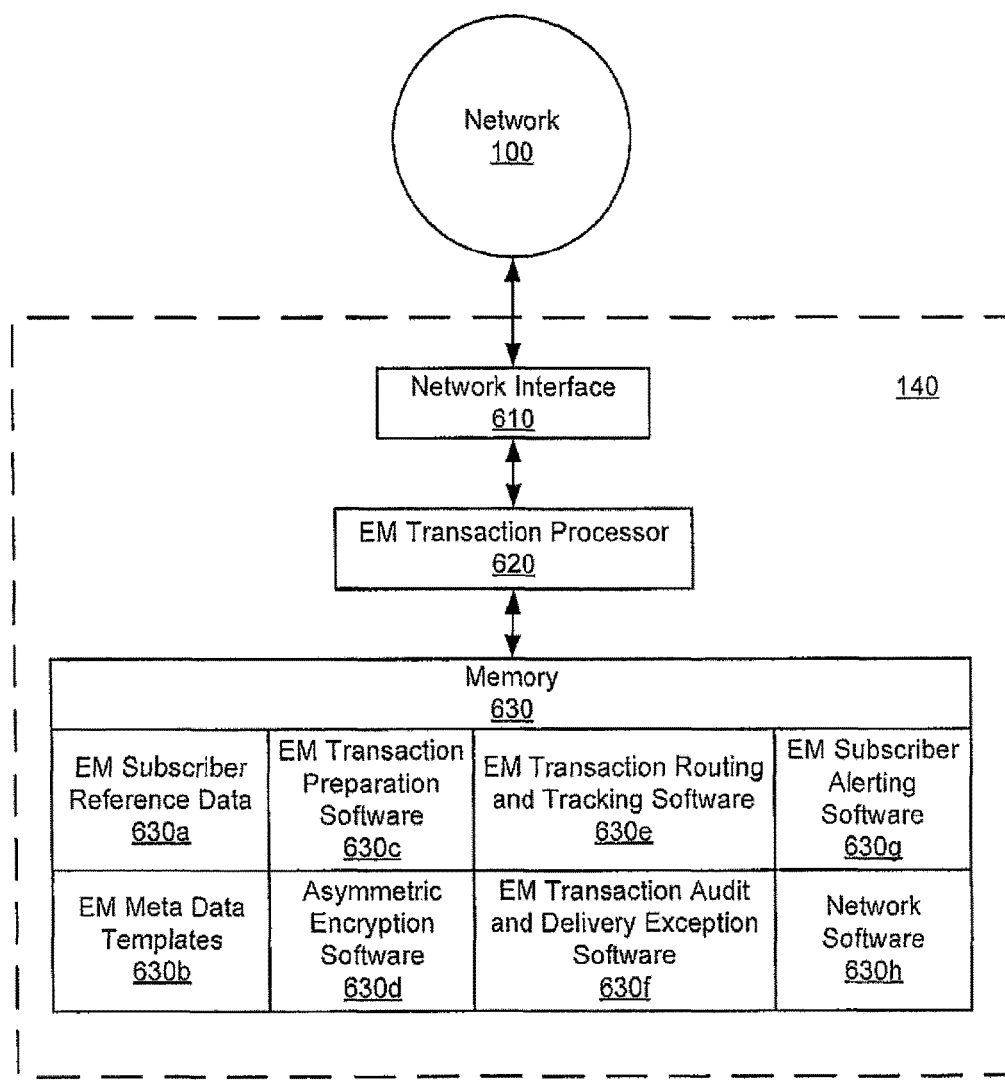

FIG. 6 depicts the eDoc TMS 140. The TMS 140 has a NIC 610, a processor 620 and a memory 630 as previously described. A memory portion 630*a* stores EM Subscriber Reference Data while memory portion 630*b* stores EM Metadata Templates. The templates, as described above, are communicated to the TMS 140 from the RDS 130. The EM Subscriber Reference Data is utilized by the EM Transaction Preparation Software stored in memory portion 630*c* to insure that, for each eDoc transaction, a valid subscription agreement exists between the eDoc Provider and the intended recipient. This data is further utilized, when a transaction has been validated, to determine what supplemental copies of the transaction are to be created, which public asymmetric encryption key is to be utilized to encrypt the eDoc transaction, and to assign the correct email address for forwarding each copy of the completed formatted and encrypted eDoc transaction. The EM Metadata Templates are also utilized by the EM Transaction Preparation Software 630c to validate that the necessary metadata and format requirements for each eDoc transaction have been met.

Memory portion 630d includes Asymmetric Encryption Software which is utilized to encrypt the symmetric encryption key that is used by the eDoc Provider to encrypt source content. The public half of the asymmetric key is known only to the TMS 140. In particular, the public key portion is not disclosed to others, including members of the ECMDN. This allows EM Subscribers 160a-e to be sure that each eDoc transaction that is presented to them is authentic and is based on a valid subscription agreement between the Provider and the recipient. Use of the Asymmetric Encryption Key, and the fact that all valid eDoc transactions are routed through the TMS 140, provides a reliable mechanism to filter eDoc transactions from other emails on an automatic (programmatic) basis. In this way, all electronic traffic other than messages subscribed to by an EM Subscriber can be filtered. This is pertinent when the eDoc transactions are routed to a reader that is compatible with conventional email clients such as Outlook by Microsoft, Inc., or Gmail provided by Google, Inc. The same benefits flow, however, when the eDoc transaction is presented through an electronic message portal provided by the EM system 102.

Depending on the implementation, the TMS 140 can apply the asymmetric key and then convey the eDoc to an EM Subscriber 160a-e, or the TMS can respond to requests from eDoc providers with asymmetrically-encrypted symmetric keys, as described further in connection with FIG. 18 below.

Memory portion 630e includes EM Transaction Routing and Tracking Software which manages the delivery and state tracking of each eDoc transaction. In this regard, the software updates a database with information concerning the movement of each eDocument. For instance, after creation of a particular document, its being sent to an EM Subscriber, its being received by the EM Subscriber station, its being opened by the EM Subscriber, and its being processed in accordance with any associated metadata can all be tracked by the EM Transaction Routing and Tracking Software as a result of messages conveyed between the EM subscriber and the TMS 140. The EM Transaction Routing and Tracking Software can also track payment status provided b Financial Intermediaries 120 for specific eDocuments. As will be appreciated, the messages between the EM subscriber and the TMS 140 are most effectively communicated through a connection made by the EM subscriber with the TMS 140 such as by connecting to the TMS 140 via a network 100 connection, e.g., using a TCP/IP connection from the EM subscriber's machine to the TMS 140.

Memory portion 630f includes an EM Transaction Audit and Delivery Exception Software which monitors the delivery-state tracking of each eDoc transaction and determines when delivery exceptions exist which must be reported to the provider for remediation. The determination of delivery exceptions can be based on combinations of eDoc transaction state, document type, provider, the passage of time or another prescribed criterion or a combination of such criteria. This software communicates those exceptions to the eDoc provider 110a-e.

An EM Subscriber Alerting Software is in memory portion 630g which monitors the transaction state of each eDoc transaction based on the public attributes of each eDoc transaction and subscriber rules established by each EM Subscriber 160a-e. As described further in connection with FIG. 17, the software controls how and when a user is alerted that eDoc transactions exist that has yet to be taken appropriate action. When conditions exist that require alerting, this software program identifies the alternative methods of communication established by the EM Subscriber 160a-e and obtained from the EM Subscriber Reference Data in memory portion 630a and creates those communications. In one embodiment of the invention, communications can be in the form of email messages to one or more email addresses, text messages to communication devices and addresses so equipped, or text-to-voice messages to voice communication enabled devices. Memory 630 also contains Network Software in memory portion 630h to handle communication of data to and from the network 100.

Figure 7:
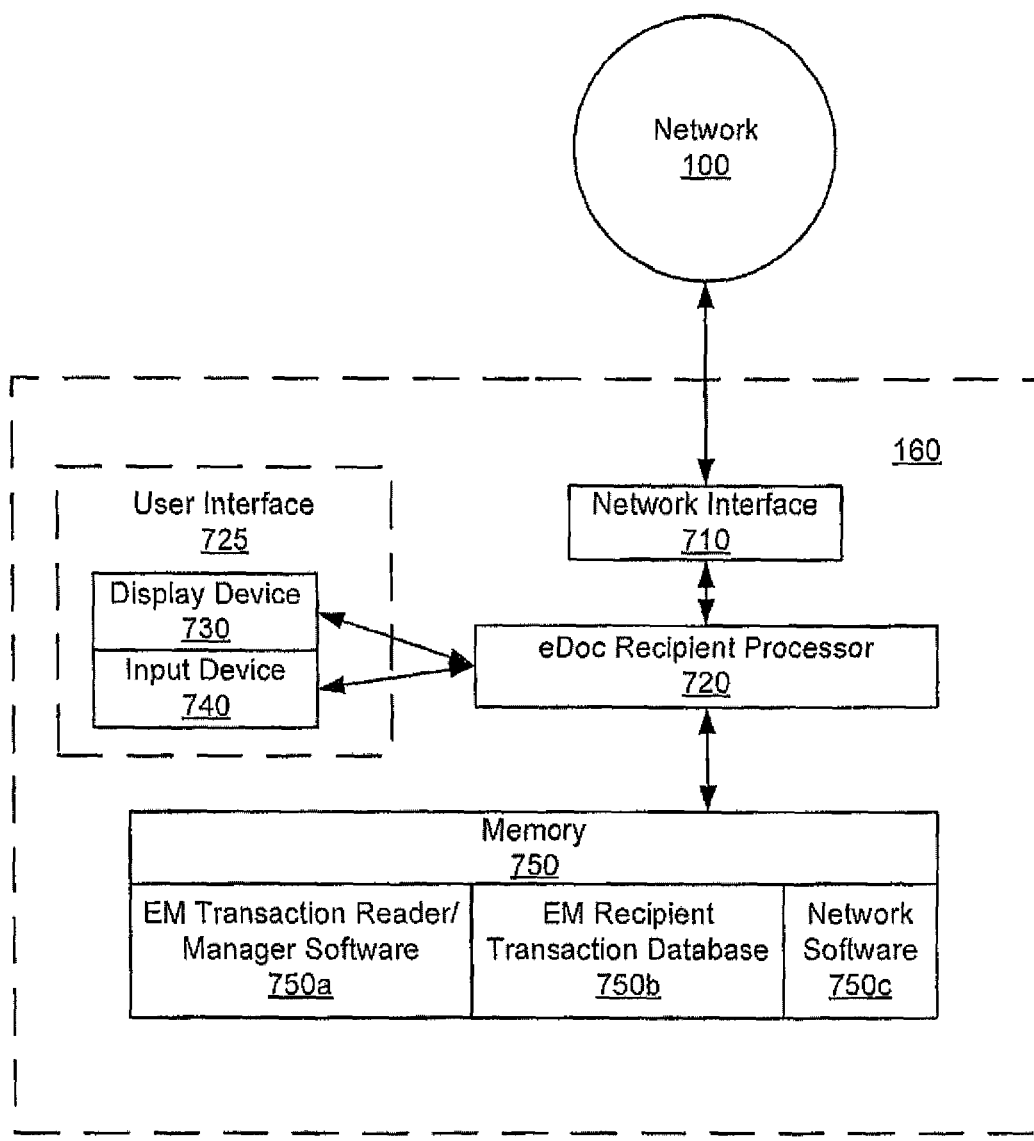

FIG. 7 illustrates certain components of the EM Subscriber station 160a-e that are relevant to the operation of the ECMDN, including a NIC 710, a processor 720, a user interface 725, and a memory 750, such as described above. The user interface 725 is further comprised of a display device 730 and an input device 740 such as described above. Memory portion 750a includes EM Transaction Reader/Manager Software which is utilized to receive, validate, decrypt, display, manage and store eDoc transactions that have been sent to each eDoc Subscriber 160a-e. Referring briefly to FIG. 15, typical sample user interface of the EM Transaction Reader/Manager Software 750a illustrates certain data elements that can be presented, processed, managed and tracked. Memory portion 750b stores the EM Recipient Transaction Database, a repository of decrypted eDoc transactions and the metadata associated with each eDoc transaction. Finally, memory portion 750c has Network Software to handle communication of data to and from the network 100.

FIG. 8 is a flow diagram illustrating the EM Subscriber registration process according to one embodiment. As indicated in steps 810 and 820, a potential subscriber accesses the EM RDS 130 either directly as indicated in step 810, or through a financial intermediary who is already a member of the ECMDN 820. When directly accessing the station, the user establishes a logon to the RDS 815 and then completes registration data input 835. (A more complete detail of data required for registration is shown in FIGS. 9 and 10.) Entering the registration data accomplishes three principal purposes: it begins the process of validating the registrant as being who they claim to be; it correlates the EM Subscribers physical mail addresses to their ECMDN address; and it creates a repository of data that can later be used to facilitate automated subscription relationship searches and requests.

If the subscriber begins the registration process by logging on to a financial intermediary with whom he or she has already established an identity 825, much of the required registration and subscription data can be passed to the RDS from the financial intermediary without re-entry of that data 830 (so-called "single entry" registration). When appropriate initial registration data has been provided 835, the subscriber must further validate that he or she is the person claimed to be 840. This validation can be partially or completely inherited through a pre-existing financial intermediary relationship, can be derived from a set of challenges and responses to data sourced from a third-party database, or can be established via a manual process based on the review of physical documentation by a party entrusted to do so by the ECMDN. As indicated in decision tree 845, if a subscriber's credentials cannot be validated, the process will end 850 and the registrant will not be allowed to become a member of the ECMDN until some future date when the validation process is successful. If the registrant's identity can be validated, however, then the registrant becomes a member of the ECMDN and becomes an EM Subscriber 160a-e.

Upon validation, the process flow continues with a EM GUID and a Primary PKI Encryption Key Pair being automatically created for the EM Subscriber, as indicated at step 855. The EM GUID uniquely identifies the subscriber to all ECMDN members and the key pair enables the asymmetric encryption functionality, described above, and is the default key used for eDoc transactions with that EM Subscriber. Secondary PKI encryption key pairs are automatically created when any message/document copy and forward functionality is initiated by an EM Subscriber. (FIGS. 12A, 12B, and 13 provide a more detailed depiction of the secondary PKI encryption key creation and management process, discussed below.) The EM Subscriber then selects either an EM Reader Software Provider 860 or identifies the Email Provider 150a-b to utilize for eDoc distribution. (As such, an email provider need not be identified or selected in all embodiments of the invention.) The selection of either the email or reader provider is used to determine or narrow the choice of the other provider. In one embodiment of the invention, the Email Provider has its own reader that is integrated with the Email Provider's other software. In another embodiment of the invention, third-party providers create versions of a reader that integrate with independent Email Providers.

Once the required EM Reader Software has been chosen, the user enters his or her existing email address at the corresponding Email Provider 150a-b or, if no email address yet exists, the EM Subscriber is provided with a mechanism to create a new email address at the Email Provider. Thereafter, an Initial Setup eDoc Transaction 865 is sent to the EM Subscriber at the designated Email Provider. This initial eDoc transaction notifies the Email Provider that they are the distribution mechanism for the EM Subscriber so that the Email Provider can initialize any necessary features for processing eDocs. For instance, the initial eDoc transaction can provide a link and mechanism to facilitate the initialization and personalization of the eDoc reader software to the EM Subscriber's QUID, the private half of their primary PKI encryption pair, and any subscription, alerting, and/or copy/forward rules that may have been established prior to initializing the eDoc reader software. The initial registration process is completed and the EM Subscriber begins the process of customizing the ECMDN to meet his or her specific requirements.

As will be appreciated from the description that follows, the reader can be a web-based application. As will be further appreciated, the reader can be presented to the subscriber by navigating and connecting to a publicly accessible portion of a website associated with the RDS 130 of the EM system 102. This can be in lieu of using or selecting an "email provider" at all.

In process 870, the EM Subscriber connects to the RDS to Establish Subscriptions and Manage Settings. In one embodiment of the invention, the customization process is started by the EM Subscriber as a step in the initial registration process. In this embodiment, the user interface runs on a remote computer and is presented to the EM Subscriber station in a web browser environment to permit remote RDS interaction. In another embodiment of the invention, the user interface is generated by the eDoc Reader software on the EM Subscriber Station and only the data is communicated between the EM Subscriber station and the eDoc Reference Data Station. In both embodiments, the functionality is the same as is described herein.

The EM Subscriber begins the process of creating subscription relationships by interacting with the RDS 130 via the network 100. A program such as the EM Registration Software module 550a can provide functionality suitable for establishing relationships for the subscriber. If the EM Subscriber had originally registered through a financial intermediary, any relationships known to the financial intermediary can be automatically populated as choices for the EM Subscriber to create subscription relationships 875. If the subscriber did not register through a financial intermediary, he or she is given an opportunity to log on to any financial intermediaries with whom they have pre-existing relationships and who are members of the ECMDN for the purpose of importing any direct or third party relationships that may be known to that intermediary. Upon completion of the import from any financial intermediaries, the subscriber is given an opportunity to log onto any commercial databases that may have data about commercial relationships 880. One such example might be a credit bureau. Thereafter, the EM subscriber is given the opportunity to have the system automatically search for registered EM Providers 885 for other potential matches using a search module that operates to discover EM Providers that have registered with the system already.

When all automated potential matches have been identified, the EM Subscriber is provided with a screen to review potential subscriptions, opt-in and establish subscriber based rules 890 about each provider and each document type. Finally, EM Subscribers can manually search for EM Providers or add EM Providers by directly entering the Providers' ECMDN GUID as described in more detail in connection with FIG. 11, or as otherwise described herein.

EM Subscribers define alerts at step 892. This process establishes personalized data and rules that are utilized by the EM Subscriber Alerting Software 630g in the TMS 140 to provide alerts about eDoc transactions outside of the ECMDN distribution channel, as previously described. Alerting is an important component of the invention in that it replaces and improves upon the visual alerting that physical mail is capable of and which has been an important function of the paper based mail process.

EM Subscribers are able to search, identify, create, copy and forward relationships 895 with other EM Subscribers. A more complete detail of the copy and forward interface and functionality is detailed in FIGS. 12A and 12B. Copy functionality allows certain types of eDocs to be automatically distributed to EM Subscribers designated by the primary recipient EM Subscriber. This functionality allows the recipient to automatically share information with other recipients while not sharing the sub-distribution facts with the eDoc Provider. An example of this embodiment of the invention occurs when a document is the financial responsibility of the primary EM Subscriber but is in fact paid or payment is shared by another EM Subscriber (e.g., bookkeeper). Forward functionality is a more structured method of redistribution that is intended to allow a proxy to manage eDocs that have been sent to a specific EM Subscriber. The forward functionality allows the primary recipient to designate another EM Subscriber to receive all of their eDocs and redirects, rather than copies, of the original eDocs. Forwarding is preferably to only one designated EM Subscriber. An example is when the designated EM Subscriber takes fiduciary responsibility the primary EM Subscribers commercial affairs.

FIGS. 9-10 depict simplified versions of the ECMDN registration screens for EM Subscribers (FIG. 9) and Providers (FIG. 10) performed by the EM Registration Software 550a. These screens are transmitted to a potential new ECMDN registrant via network 100 for presentation in the user interface of any network-connected computing station. An embodiment of this aspect of the invention can comprise a web browser executing on a conventional machine such as a personal computer connected to the Internet.

FIG. 9 depicts the registration data requirements in the context of a data entry form as may be presented to a potential EM Subscriber 160a-e. Input area 910 includes a number of fields to capture a multitude of name components to both identify the EM subscriber to the network and to facilitate complex and accurate subscription searches. The name input area is further broken down into primary name components 912 and supplemental name components 914. Both component areas of the user interface provide for names to be broken into several discrete data components first name, middle name, last name, salutation prefixes, generational name suffixes and professional designations. The supplemental name components 914 differ from the primary name components in that multiple entries may be included in each field as well as specific negative field identifications. Negative field identifications allow the user to improve search results when the user is aware of other persons with similar names and addresses as might be typical of multigenerational members of a single family. In a typical example, a subscriber might indicate that they are Jr or Dr., but not Sr. or III.

Input area 920 is part of the same data entry form and allows the potential subscriber to enter a multitude of physical addresses where they currently receive mail. As illustrated, a window captures the primary address information and additional windows can be presented for supplemental address information. This data is utilized for subscription matching purposes.

Input area 930 allows the potential subscriber to enter a multitude of email addresses to be utilized. Input area 932 requires that the potential subscriber enter an email address that is to be utilized for eDoc transaction distributions. This email address must be a valid address from an Email Provider 150a-b who is a member of the ECMDN. In one variation, the EM system 102 serves as the "email provider" in that the user can designate the EM system as the portal for EM distributions of eDoc transactions. Preferably, the registration software automatically validates that an eDoc distribution email address is valid and prevents the user from proceeding if a valid address is not identified. Further, if the potential subscriber does not have an email address that is valid for eDoc transactions, he or she is presented with an option to immediately create an address with any of a multitude of Email Providers 150a-b who are members of the ECMDN. Input area 934 allows the potential subscriber to enter additional email addresses, though these need not be utilized for eDoc transactions and are not required to be from Email Providers who are members of the ECMDN. The purpose of the alternate email addresses is to facilitate improved subscriber/provider matching and also for EM Subscriber alerting, if this feature is enabled by the EM Subscriber.

Input area 940 captures a multitude of telephone numbers from the potential subscriber. These telephone numbers can be utilized to facilitate improved subscriber/provider matching and also for EM Subscriber alerting, if this feature is enabled by the EM Subscriber.

Finally, input area 950 allows the potential subscriber to enter his or her social security number. This data is also utilized to facilitate improved subscriber/provider matching. As can be appreciated the depth of data provided through the form of FIG. 9 enables the system to perform complex search and match operations and thereby automate the subscription process.

FIG. 10 depicts a form useful for collection of data for a potential eDoc Provider 110a-c. Input area 1010 allows the potential eDoc provider to enter a multitude of business names to both identify itself to the network and to facilitate complex and accurate subscription searches. The potential eDoc provider enters at least one business name 1012a and optionally a multitude of alternative business names 1012b-d that can be used to improve search results. Input area 1020 captures a multitude of physical addresses the eDoc Provider currently receives mail or utilizes otherwise to facilitate the outsourcing of business processes. Input area 1030 provides for the entry of a multitude of attributes about the business and the types of eDocs that the eDoc Provider intends to send. These attributes are utilized to determine which metadata templates 550b are to be utilized by the eDoc Provider and enables standardization of eDoc transactions and eDoc transaction processing by the EM Subscriber 160. Attributes specified in area 1030 are also utilized by the EM Provider/Recipient Subscription Rules Software 550c to enable detailed provider/recipient subscription rules. Additionally, input area 1040 provides for the entry of financial account information of the potential eDoc provider. In one embodiment of the invention, this information includes data required to facilitate payment to the provider through the ACH Network and various credit processing networks. Other additional embodiments are possible. The data collected in input area 1040 is utilized to enhance the eDoc Provider Specific Reference Data 430a in the Financial Intermediary station 120.

FIG. 11 depicts part of a user interface that can be utilized by EM Subscribers to search for Providers and other EM Subscribers that they would like to add to their network for the purpose of creating various types of subscription relationships. In all described embodiments of the invention, EM Subscriber specified data is searched against registration data provided by all ECMDN participants and stored in the RDS 130. Search queries are provided over the network 100 from a machine operated by the client for execution at the RDS 130. By executing searches through the user interface, EM Subscribers can build their network of potential subscription relationships. As previously described in FIG. 8, however, relationships can be automatically searched based on registration information provided by the EM Subscriber and information which has previously been stored in third party databases. Typical examples include electronic banking databases, credit bureau databases, and financial software. Providers can also initiate searches for EM Subscribers that are already their customers by requesting the ECMDN search against a file of customer data provided by the eDoc Provider. The automated processes may not identify all eDoc Provider relationships or may not do so in a timely enough manner to satisfy a particular EM Subscriber. Additionally, when an EM Subscriber desires to establish a subscription relationship with another EM Subscriber for the purpose of copying or forwarding documents, there may be no appropriate automated method to use at all. Accordingly, a mechanism is provided for EM Subscribers to search and add other ECMDN members to their personal network within the ECMDN. Input fields 1110 allow the EM Subscriber to enter various criteria to search the ECMDN participants with matching criteria.

The fields 1110 permit the EM Subscriber to enter one or more of the criteria they know. Some fields, like the Eco-Mail ID 1115, the Telephone Number 1125, and the Email Address 1130, can be very effective at narrowing the results to either a single or a small number of members of the ECMDN. Other fields like Zip Code 1120, City 1130, State 1135 and Street Address 1140 and Name 1145 may require multiple fields be entered to narrow the results to a small enough set.

The lower portion of FIG. 11 depicts a results window having a region 1150 that displays the results of the search criteria and is automatically updated as more search criteria are added. The results can be searched by scrolling through the results list or by sorting on any of the fields of data (columns, as illustrated) displayed. When the EM Subscriber has identified the correct ECMDN member they check the select box 1155 for that entity and use the submit button 1160 to post the selection.

Submitting a selection invokes further processes. If the entity selected by the user is an eDoc. Provider, a specialized eDoc transaction is created and sent to the eDoc Provider. This provides EM Subscriber referential data and requests that a subscription relationship be created. If the selected entity is another EM Subscriber, the selected EM Subscriber's GUID is stored in the selecting EM Subscriber's personal network within the ECMDN for use in subsequent copy and forward functions. FIG. 12A describes the user interface utilized to initiate eDoc copy functionality. This functionality facilitates the management of commercial relationships in ways that the EM Subscriber has become accustomed to, but which are unknown to the eDoc Provider. An example of such functionality would occur when an EM Subscriber receives a document because he or she is legally responsible, but when, in fact, a spouse or other designee actually manages the operational aspects of the relationship such as payment or bookkeeping. The user interface can comprise a grid, as illustrated, which allows in area 1210 an unlimited number of Providers who have subscription relationships with the EM Subscriber to be displayed along a vertical axis and in area 1220 an unlimited number of EM Subscribers who have been added to the EM Subscriber's personal network within the ECMDN to be displayed along the horizontal axis. Area 1230 is a dynamically created grid with a selectable area created for each intersection of eDoc Provider and EM Subscriber. The EM Subscriber designates any additional EM Subscribers to be copied on documents from particular Providers by selecting the checkbox at the corresponding intersection. Each time an intersection is selected, the user interface can invoke a command that displays a screen such as illustrated in FIG. 12B.

FIG. 12B is a further screen within the eDoc copy user interface configured to capture further instructions of the EM Subscriber to further limit the type of documents within each EM Subscriber/eDoc Provider relationship that are to be copied. Area 1240 displays an unlimited number of Providers who have subscription relationships with the EM Subscriber to be displayed along a vertical axis. Area 1250 displays along the horizontal axis all document types that can be provided by any of the Providers with whom the EM Subscriber has a subscription relationship. Area 1260 is a dynamically created grid with a selectable area created for each intersection of eDoc Provider and document type. The EM Subscriber designates any additional EM Subscribers to be copied on documents from particular Providers by selecting the corresponding checkbox at the intersection. Several additional features of this user interface are also displayed in FIG. 12B. Area 1265 illustrates an intersection between an eDoc Provider and a document type that is not a valid selection and is automatically restricted from selection. Area 1270 illustrates an intersection between an eDoc Provider and a document type that has previously been restricted and is not subscribed to by the EM Subscriber and is automatically restricted from selection. Clicking the Submit button 1235 invokes a further process which is critical to the automated management of EM Subscriber designated copy recipients, as described next.

FIG. 13 is an exemplary subset of the data table which is created when an EM Subscriber designates that copies of documents are to be automatically sent to additional EM Subscribers. Such designations by an EM Subscriber are by default private and cannot be viewed by the eDoc Provider. The creation of copies to other EM Subscribers creates a matrix of asymmetric encryption keys that correlate to each unique set of eDoc transaction relationships. As previously described in FIG. 8, an initial primary asymmetric encryption key pair is created when a EM Subscriber registers with the ECMDN. Data relating to the key pair is stored in row 1340. The primary key pair is the default key pair utilized for all eDoc Provider subscription relationships and is utilized for all eDoc transactions with a specific eDoc Provider until the EM Subscriber designates one or more additional EM Subscribers to be copied on documents from a given eDoc Provider. More specifically, describing record 1340, the EM Subscriber GUID 1310 is stored in this record. The Key Type 1305 is stored as "primary" and the public half of the asymmetric encryption key is stored in the PKI Public Key field 1320. The Start Date 1325 also can be stored with a value equal to the time when the record was created. Each record in the table that does not have an End Date 1330 assigned can be considered a current record. Only one current primary key record is permitted for an EM Subscriber.

When a copy designation is created, as described in connection with FIG. 12, a secondary asymmetric key pair is created for that relationship between the primary EM Subscriber and the specific eDoc Provider. Exemplary records are stored in table record 1350-1380. In these cases, the Key Type 1305 stored is "secondary" and the eDoc Provider GUID is stored in the Provider ID 1315 field. The primary EM Subscriber's GUID is stored in the Subscriber field 1310. The ECMDN automatically creates a new PM key pair and the public component is stored in the PKI Public Key Field 1320 and the time of creation is stored in the Start Date 1325 field. The EM Subscriber GUID of EM subscribers who have been designated as copy recipients is stored in Sub-Subscriber fields 1335. If the primary EM Subscriber adds additional EM Subscribers to an existing eDoc Provider copy relationship, only the new EM Subscribers GUID(s) are added to the existing record. If an EM Subscriber removes the copy designation for a previously authorized subscriber, the previously current secondary record is amended by adding an End Date 1330 and a new supplemental record is created and added to the list of all of the remaining additional EM Subscribers and a new Start Date 1325 is created. Should the copy designation be removed for all additional EM Subscribers, an End Date 1330 will be added to the supplemental record, no new supplemental record is created, and the primary key becomes the default for that eDoc Provider relationship.

The subscriber/provider key look-up table of FIG. 13 preferably also includes entries that track document-type (not shown). Document-types, as described herein, are used in the content management and control process. The entries can comprise additional rows with associated keys.

In addition to the described process, when a supplemental record is created or modified specialized eDoc transaction records are sent to all affected EM Subscribers. For instance, if a new copy subscription relationship is created, the new EM recipient must opt-in to the copy subscription request. And, if an existing relationship is being updated with a new PKI key, the update process can be completely automated and executed through message transfer between the affected parties. In all cases, PKI private key storage is transparent to the EM Subscriber.

FIGS. 14A and 14B are high-level descriptions of typical metadata templates that can be utilized in the operation of the ECMDN. FIG. 14A describes public metadata fields that are common to all eDoc transactions. FIG. 14B describes private metadata fields which may vary based on underlying characteristics of each eDoc transaction. With respect to both public and private metadata, the included data fields represent a subset of metadata that can be included in eDoc transactions, though fewer or additional fields can be included in embodiments of the invention. The templates more generally are part of an EM schema that the EM system 102 can recognize, process and act upon in any of the ways described herein including, without limitation, routing, auditing, alerting, sorting, automatic payment/funds transfer, and so on.

Turning to FIG. 14A, the table illustrates along several rows a number of public metadata fields 1410, Public metadata fields are more standardized across eDoc transaction types and are accessible in unencrypted form at various stages of the eDoc transaction process after they leave the Provider's internal systems and before the eDoc transaction is decrypted by the EM Subscriber's eDoc receipt and management software. The public metadata fields are required to be unencrypted so that addressing, asymmetric encryption, routing, auditing and alerting can be performed.

FIG. 14B illustrates a set of private metadata templates that are suitable for a particular industry. As illustrated, the industry is the financial sector, and the sub-industry is banking. The columns identify a selection of various metadata templates 1430 that can be categorized by industry 1440, sub-industry 1445 and document type 1450. The metadata templates 1430 are exemplary and in practice are far more extensive. For instance, the financial industry includes other sub-industries such as brokerage, and other industries include insurance, energy, telecommunications, and so on. Private Metadata fields 1420 are added to the eDoc content prior to symmetric encryption by the eDoc Provider and are maintained securely at all times in the eDoc transaction for use is by the EM Subscriber's eDoc receipt and management software. The primary purposes of the Private Metadata fields is to allow the EM Subscriber software to know the key attributes of any received documents without having to specifically open and examine the full content provided by the eDoc Provider and to facilitate automated organization and management of eDocs.

The standard template maintained for each document type of a given industry/sub-industry has an associated set of private metadata that is particular to that document type. For example, in the insurance industry, health sub-industry, the spectrum of standard templates can include a statement, an invoice, a policy, other legal documents, an service change document, security information, marketing materials, and any other category. By standardizing the template, the EM system 102 can validate—prior to distribution—each transaction that an individual content provider seeks to distribute, if this is desired. Validation is discussed below in connection with FIG. 18. Briefly, when utilized, a validation engine executing at the eDoc provider station 110 compares the data in the public and private metadata fields of the template to expected values and formats and then supplies a validation signal suitable for action by other modules that govern the construction of the message to be sent to the subscriber ("transaction"). Whether a transaction is sent to the TMS 140 can therefore be made to depend upon a validation of the metadata at the eDoc provider 110, under the content provider's custody and control. On the other hand, transactions that pass this first-stage validation are transferred via the TMS 140 to one or more destinations maintained for the subscriber by the TMS, and the metadata can be used among other things to provide intelligent alert and reporting functionality as described herein.

FIG. 15 depicts an example of the EM Subscriber's eDoc Reader user interface. The depicted interface is one of many ways that the functionality of the eDoc Reader can be expressed. The interface permits action by the EM Subscriber to cause further processing of EDoc transactions such as accepting or denying subscription requests, payment of invoices, invocation of user-established rules, printing, document management, etc. In part, the interface can be branded to a specific provider, such as a bank that serves the roles both as an eDoc provider 110a and as a financial intermediary 120a for clearing payment transactions with other providers. When so branded, it is expected that the relationship between the subscriber and the bank is such that the subscriber has linked one or more bank accounts he or she has with that bank so that the eDoc reader defines, in effect, a virtual branch at which the subscriber can authorize payments, manage transactions with vendors (other providers), and otherwise implement the functionality described herein while using funds from the linked account. Such a configuration setting permits the subscriber to utilize a single sign in to move between the eDoc reader software 750a and a portal controlled by the subscriber's bank. In the absence of such a branding or link, the EM system 102 can serve as the financial intermediary, arranging for payment between one provider (e.g., a bank) and another (e.g., a local service provider).

The interface 725 is a graphical user interface (GUI) provided by a module executing in the processor of the subscriber's computer. The interface 725 provides an organization for the transactions received from the TMS 140 that extends beyond conventional email programs by providing alerts and action-management rules to better ensure that transactions are noticed, acted upon, and preserved. In part, the interface 725 enables multiple views of received transactions. As illustrated, the "inbox" transactions of all eDoc providers have been selected in the source control panel 1502a, such as by click-selecting a list of potential sources of received eDoc transactions. The source control panel enables the subscriber to view a dynamically created set of eDoc transactions which may be arranged by action state or by other criteria a subscriber can set by selecting Search Results 1502b and entering data on a suitable supplemental input screen (not illustrated). The subscriber can also filter the source results by selecting all providers, an individual provider, or a user-selected multitude of providers to which the subscriber is subscribed in the provider panel 1502. As such, the GUI module is operative to configure the processor of the subscriber's machine to organize whatever content is received over the network 100 on a display or other output device associated with that machine using criteria input by the user, included in metadata that accompanies the content, or both.

This selection presents the un-archived and not-deleted transactions of all providers in the transaction display 1504. If a particular provider is selected, then the transaction display 1504 presents a filtered list of transactions for only the selected provider. The list in provider panel 1502 is dynamically populated in response to subscription-creation pursuant to the process flow of FIG. 8. The interface can include a form 1506 for submitting the identity of an eDoc provider. For instance, the GUID of the provider can be input into the form 1506 to cause a further interface window to be presented, such as illustrated in FIG. 11, in order to enable the subscriber to add or search for eDoc Providers to add to their network of subscription relationships.

The transaction display can alternatively or additionally be configured by interaction with the user to display transactions on the basis of recipients, tags, or date range by selecting a suitable control 1508, 1510, 1512 to call up a respective panel.

The tags 1510 can be included with the content that is included in the eDoc transaction. For instance, if the document is a bill for insurance of a particular type, the tags that can accompany the eDoc transaction can include "insurance" and "automobile". Tags can be set by subscribers to associate documents in the inbox with a particular concept, such as "capital improvement" or "tax". Using the various sort criteria, the subscriber can readily review and tag transactions on the fly or over a particular period (e.g., calendar year 2010), but selecting providers with whom the subscriber expects to have transactions relating to say, capital improvement, and displaying the transactions for that subscriber, and tagging them to "capital improvement." In this way, the subscriber can organize his or her transactions rapidly and efficiently. Moreover, all items having a certain tag can be selected and forwarded, such as "banking" or "tax" documents that are to be forwarded to the subscriber's accountant as a mass action initiated by the subscriber. The net effect is that the eDoc Reader provides a vehicle for electronic management of all of the subscriber's authorized transactions. Moreover, the richness of the content increases on a regular basis, providing a basis to better ensure that the subscriber accesses his or her account regularly.

The interface 725 is presented by eDoc Reader software 750*a* executing on the subscriber's machine 160. As noted, the interface can be presented within a conventional web browser that is executing on the client's machine, or can be a locally resident application (e.g., a desktop application). In some implementations, the software 750*a* can execute remotely, as is known in various cloud-computing applications. Indeed, the functionality provided by the software 750*a* is the inventive aspect of the present disclosure; the implementation can vary widely as understood by those of skill in the art.

The software 750*a* can be constructed from a plurality of modules each having functionality to implement the interactive features of the interface 725 (e.g., a search module, an instant subscribe module, panel creation modules, etc.). Transactions, once received, are unbundled by the eDoc Reader software 750*a* using the private portion of the asymmetric key pair associated with each subscriber/provider pair. In this regard, it is important to appreciate that while the transactions are delivered to the subscriber from the provider by passing through the TMS 140, the transactions are preferably doubly-encrypted initially with a symmetric key that encrypts the content and private metadata (which encryption is performed by the content provider) and subsequently by an asymmetric key (determined by the TMS 140) that is used to encrypt the symmetric key. This arrangement ensures the confidentiality of the documents being conveyed as the payload of each transaction, while allowing the TMS 140 to use the public metadata for routing, archiving and message tracking purposes.

The eDoc Reader software 750*a* is configured, in part, to unpack the document payload and access the private metadata by utilizing the public metadata associated with each eDoc transaction to determine and access the private portion of the appropriate provider/subscriber asymmetric key pair that, preferably, is locally maintained. As shown in FIG. 13A, subscribers have a key table that is similar to the key table at the TMS 140 (see FIG. 13), except the table maintained at the subscriber machine 160 includes the private portion 1350 instead of the public portion 1320 of the PKI key ("PKI Private Key"). FIG. 16 details the unpacking process when a transaction is received at the eDoc Reader 750*a*; suffice to say that the PKI Private Key for that subscriber can be applied to the transaction so as to expose the symmetric key used by the eDoc provider 110, and then the symmetric key can be directly utilized to decrypt the private metadata and the content. Once unpacked, the transaction payload comprises a document, such as a pdf or xml file that can be viewed by the subscriber within a window of the reader, or using another program such as Adobe's Reader or a web browser application such as Microsoft's Internet Explorer. The document can be click-selected and opened through the interface 725, such as by clicking on icon 1520. In addition, the public and private metadata of the unpacked transaction is used to populate a database of eDoc transactions and attributes which is further utilized to populate the various columns of the interface, and to provide interactive controls, as appropriate.

One example of an interactive control concerns a transaction of type subscription request. This type of transaction requires user-action and the interface 725 preferably provides controls 1530 to accept or deny the subscription request. Only after accepting the request is there any possibility that a particular eDoc Provider can send transactions to the subscriber or that another subscriber can copy or forward eDoc transactions to the user. This opt-in process precludes "junk mail" from entities with whom the subscriber does not have a subscription in place from cluttering the eDoc Reader. Upon accepting the request, the table in FIGS. 13 and 13A are both updated. The table of FIG. 13A can updated through local processing at the subscriber's machine 160, but updating the table of FIG. 13 is attendant with a message between the subscriber machine 160 and the TMS 140.

The standardization of the templates enables a further important use of the private metadata in an implementation of the invention. More specifically, for transactions that require payment of specified amounts by certain dates, the standard template has those key parameters external of the document itself and within the metadata for use by the eDoc Reader in presenting the transactions with that data arranged to permit sorting by amount due, due date, provider name, and so on. In addition, an interactive payment control 1540 can respond to user action by initiating a payment process on behalf of the subscriber with his or her designated banking institution (e.g., by opening a port and connection to a particular institution from the subscriber machine 160 over the network 100 to that institution). Moreover, a preference file can store the subscriber's preferences with respect to which account to draw against for payment of invoices based on, for example, the vendor identity, the amount due, or the recipient. Likewise, the preference file can initiate an automated transfer, say, from an interest bearing savings account to a checking account as a preliminary step to each invoice payment. The preference file (not shown) can include other settings such as a rule 1550 to pay without waiting for manual action if the amount (say, from a given vendor) is below a prescribed amount. Other rules can govern when-to-archive 1560 a transaction so as to empty the inbox and focus the subscriber on open items. Such rules governing action preferences, and other data relating to each particular subscriber, can be stored in a subscriber profile.

An action module executing in the processor of the subscriber's computer or in a server in communicative connection thereto cooperates with subscriber interactions with the GUI, via a monitoring of the GUI module, to automatically act on at least a portion of the secure content that the subscriber has received. The actions taken are made on the basis of any action required, as specified in the metadata included with the content, and by an action date, also included in the metadata. The metadata that accompanies the secure content can be transmitted separate from the secure content itself (not preferred), can accompany the transmission that includes the secure content but be separate from the secure content, or can be embedded in a file that includes the secure content itself (preferred). Moreover, actions can be taken in accordance with any action preferences in the subscriber profile.

With continued reference to FIG. 15, the interface can provide a variety of alerts, again using the decrypted private metadata and, optionally, the user preference file, to visually distinguish paid invoices from unpaid invoices, invoices with a due date that is approaching and invoices that have an imminent due date. Such visual distinctions can comprise a color coding such as green, yellow and red to signify increasing urgency as a due date for payment approaches.

The interface also includes conventional navigation features such as searching, file management, editing and the like which can be conventional in design and implementation.

Optionally, when a particular entry is selected, such as the "21$^{st}$ Century" invoice that is highlighted in FIG. 15, a custom link can be provided to the subscriber that can be click-selected by the subscriber to lead to marketing information, educational information, savings, rates, discounts, incentives and so on. In part, the link can incorporate subscriber information because the provider is part of a trusted network and use that information to provide a custom quotation to the subscriber.

The eDoc reader software permits communication back to the senders in reciprocal fashion using the symmetric key that is associated with the subscriber and each provider and using the asymmetric key service of the EM system 102 substantially as described, except that because the reply is based on an enriched document that was previously provided by the provider and processed by the EM system and which has an EM Transaction Number (described below), the AESK can be issued by the EM system to the eDoc reader software for wrapping around the symmetric key, substantially as described above, as one way of ensuring security of the content while being distributed from the subscriber back to the provider.

As such, in a presently preferred implementation, the EM system 102 can comprise a portal through which subscribers obtain all of their EM messages (eDoc transactions) that are permitted to be delivered on the basis of an authenticated relationship with one or more providers. In like manner, subscribers can reply to providers and enjoy secure, bi-directional communications—to the extent permitted by the eDoc provider and the document type.

Some of the messages that are returned after the eDoc reader software has received the secure content are in support of an audit-trail, namely, to confirm receipt of the materials that have been sent by the provider, or to confirm decryption of the content, or both, as an indicator of proof of delivery.

FIG. 16 is a high level depiction of the flow of an eDoc transaction from inception by an eDoc Provider 110*a-c* to encryption and routing by the EM TMS 140 through high level eDoc transaction distribution and tracking by an Email Provider 150*a-b* and on to final distribution and decryption by EM Subscribers 160*a-d*.

Each eDoc transaction begins when an eDoc Provider 110*a-c* has some content that is to be communicated to another entity. In the current example, the content is data that has historically been in written form and has been distributed by physical mail delivery, but it should be noted that the content could be video, audio or any other data than can be stored completely in electronic form. The content that is to be sent is initially stored in the eDoc Provider's Content Repository 1602.

The eDoc Provider 110*a-c* determines that a recipient is an EM Subscriber by looking at EM Recipient IDs stored in memory 330*d* and retrieving content 1604 that is to be turned into an eDoc transaction from the eDoc Provider Content Repository 1602. The eDoc Provider subsequently performs Content Enrichment 1606 by adding any eDoc Content Metadata stored in memory 330*b* that is determined to be required by the EM Metadata Template stored in memory 330*c*. When the content enrichment 1606 has been completed, Symmetric Encryption of the Enriched Subscriber Specific Content 1608 is performed. Those familiar with the art will recognize that symmetric encryption is a broad term for a widely known set of encryption technologies whose common characteristic is that encryption and decryption can be performed utilizing the same key. In one embodiment of the invention, the key itself is chosen randomly by the eDoc Provider 110*a-c* for each eDoc transaction. After the encryption of the data has been completed the eDoc Provider causes an eDoc Pre-Transaction Record 1610 to be formatted. This record includes the encrypted content, the encryption key utilized to encrypt the content, and public metadata (as identified in the EM Metadata Template) stored in memory 330*c*. The formatted pre-transaction record is transmitted to the EM TMS 140 in connection with a request for an asymmetric key to use in distributing the transaction, as indicated at block 1612, and is stored in the eDoc Provider Local EM Transaction Database 1614.

Upon receipt by the EM TMS 140, each pre-transaction is checked for validity 1616. Such validity checks can include whether a valid subscription agreement existed between the eDoc Provider and the EM Subscriber for the declared type of document, if the pre-transaction record were properly formatted based on the Provider and document categorization, and if all of the necessary public metadata fields were present and valid. If the pre-transaction record fails validation, the station notifies the eDoc Provider of the transaction exception 1618 along with a detailed error code as to the nature of the exception. The notification can be stored in the eDoc Provider Local EM Transaction Database 1614 for reprocessing. If the pre-transaction passes validation, the TMS 140 communicates with the EM RDS 130 or a subscriber database at the TMS 140 to Determine Asymmetric Encryption Key and Supplemental EM Subscriber Records

1620. This determination can be based on the provider GUID, the subscriber GUID, and the document type of the current eDoc Transaction, using information such as detailed in FIG. 13. Upon completion of the process, as indicated at block 1622, asymmetric encryption of the symmetric key utilized by the eDoc Provider is performed and provided in the pre-transaction record. At block 1624, the formatting and building of the primary and supplemental eDoc transaction records are performed. A further process stores and transmits the eDoc transactions 1626. This process can store the transactions to the EM Transaction State Database 1628, transmit the EM Transaction Number for the Primary eDoc Transaction to the eDoc Provider 1630, and also Transmit all Primary and Supplemental eDoc Transactions to the Designated Email Providers, as indicated at block 1632. The recipients can be ascertained by communicating with the EM RDS 130 to determine the current valid email address for each EM Subscriber 160*a-e*.

Subsequently, each eDoc Transaction is received by the designated Email Provider 150*a-b* and is checked for validity 1634. The primary validity checks by the Email Provider are to determine if the entire eDoc transaction has been received without data flaw and to insure that the destination email address is correct and deliverable. If the eDoc transaction record fails the validation checks, the Email Provider notifies the TMS at block 1636 such as with a detailed error code as to the nature of the exception. The notification can be stored in the EM Transaction State Database 1628 for reprocessing. If the eDoc transaction passes validation, the Email Provider stores the eDoc transaction and sends an acknowledgment to the EM TMS 1638. The eDoc transaction is stored in the Email Provider's Email Transaction Database 1640 and the EM TMS 140 updates the EM Transaction State Database 1628 to reflect the current state of the eDoc transaction.

In a variation of the foregoing, when the EM system 102 provides a portal for message review, there is no interaction with a separate email Provider. As such, at block 1632, the system stores the Primary and Supplemental eDoc Transaction data. Also, the check for validity at block 1634 is again to determine if the entire eDoc transaction is without data flaw, but that is all because the destination address is the subscriber account and the subscriber is validated at block 1616. If the eDoc transaction passes validation, an acknowledgment is sent to the EM TMS 1638. The eDoc transaction is stored within the EM system 102 and the EM TMS 140 updates the EM Transaction State Database 1628 to reflect the current state of the eDoc transaction.

Continued routing of the eDoc transaction occurs when an EM Subscriber 160*a-e* performs a Sign-in and Email Retrieval 1642 and the subscriber's Email Provider 150*a-b* forwards eDoc transaction emails to the subscriber 1644. The Sign-in and Email Retrieval process 1642 can be accomplished by a dedicated eDoc reader which is able to automatically retrieve only eDoc transactions from the Email Provider 150*a-b*. Alternatively, the eDoc reader can be incorporated into an existing email reader system, or the eDoc reader functionality can be incorporated into other software that embeds an eDoc reader. More generally, all eDoc readers have a commonality of communication, decryption and content organization which is identified in this FIG. 16 and which is further detailed in FIG. 15. As such, whether the subscriber signs in to an email Provider system or to other software with an embedded eDoc reader as may be provided by a portal to the EM system 102, the eDoc reader is operative to provide the functionality described herein. Upon receipt of the eDoc transaction, a reader program operating for the EM Subscriber 160*a-d* provides an acknowledgement to the Email Provider 150*a-b*. The Email Provider stores this acknowledgement to the email transaction database and also creates and transmits an acknowledgment 1646 to the EM TMS 140 that each specific eDoc transaction has been received by an EM Subscriber. The TMS 140 updates the EM Transaction State Database 1628 to reflect the current state of the eDoc transaction.

In an arrangement in which communications with the eDoc reader are made free of any email Provider, the acknowledgement and update of the EM Transaction State Database (block 1628) can be made on the basis of the eDoc transaction being in the subscriber's queue of documents.

The EM Subscriber's eDoc reader automatically decrypts all eDoc transactions and stores the decrypted content and associated metadata to a database associated with the eDoc reader 1648. It should be noted that the eDoc Reader Database 1648 may be located locally to the eDoc Reader software or may be remotely stored and accesses via network 100. The subscriber station also creates and transmits an acknowledgment 1650 to the EM TMS 140 that each specific eDoc transaction has been decrypted by the EM Subscriber's eDoc reader. The EM TMS 140 updates the EM Transaction State Database 1628 to reflect the current state of the eDoc transaction.

Referring now to the process flow of FIG. 16A, a modified flow as compared to the process just described illustrates another path for the creation and movement of content from a eDoc Provider 110*a-c* toward a subscriber. In FIG. 16A, like reference numbers are accorded to steps in the flow that correspond to the steps of FIG. 16. In this process flow, the eDoc Provider 110*a-c* maintains custody of the content through the encryption and double encryption steps, and only then routes a transaction to the TMS 140 for distribution to Subscribers 160*a-e*.

The process flow of FIG. 16A proceeds as described above to retrieve content that is to be sent to a particular Subscriber and then enrich the content with public and private metadata 1602-1606. At step 1607*a*, as a departure from the approach of FIG. 16, the eDoc Provider 110 communicates with the template compliance validation module (TCVM) to validate that the public and private metadata correctly utilize an appropriate EM template that has previously been provided by the RDS 130 for use in various transactions. The TCVM processing is described in greater detail with regard to FIG. 18. Briefly, it comprises a module that resides at the eDoc Provider computer 110 and operates as a "black box," processing inputs and selectively permitting transactions to advance beyond a proposed stage, as described next.

If the validation is not satisfied, as tested at block 1607*a*, the proposed transaction is rejected and the proposed transaction is returned to the eDoc Provider's system for reprocessing 1607*b*. Conversely, if the validation is satisfied, the TCVM generates and communicates to the eDoc Provider a pseudo random number, described in more detail below, to be utilized as a symmetric encryption key for the proposed transaction. Thereafter, the eDoc Provider symmetrically encrypts the content and the private metadata with the generated key 1608, and formats the eDoc record including the encrypted content and private metadata on the one hand and the unencrypted public metadata on the other hand 1610. Importantly, the public metadata includes the document type and recipient subscriber. At block 1612*a*, the eDoc Provider communicates with the TMS 140 in order to request that the symmetric key—which already has been utilized to encrypt the content and the private metadata—be asymmetrically encrypted with a key associated with the Subscriber, without transmitting the symmetric key, the content or the private metadata itself.

Meanwhile, the TMS maintains a table of Subscriber keys and is able to validate, at step 1616A, whether the request is to be accepted and return with an asymmetrically encrypted key or not. In part, the TMS has a processor that is configured to use a key-request validation module (KRVM) to examine the request message from the eDoc Provider 110 and act on the request. For instance, the KRVM can comprise code that executes within the processor so as to configure it as such. The request message can include a Provider GUID of the particular eDoc Provider 110 making the request. As a control mechanism, the KRVM can be configured to look up the address associated with the Provider GUID in the message and respond to the address that the KRVM maintains rather than any address in the request message so as to provide a control against spoofing and the like. The request can further include a Subscriber GUID of the Subscriber to whom the transaction is to be delivered and a document type based on the previously validated EM template. The request can, but need not, include a transaction number. The transaction number serves the purpose of uniquely identifying the transaction within the EM system 102, including to uniquely identify the transaction to the TMS 140. The transaction number, for instance, can be a sequentially generated number, and in the form can include two components: a first component that can be the same as the Provider QUID but which is uniquely associated with a particular eDoc Provider; and a second component that is sequentially updated with each request message. Alternatively, the transaction number can be generated independently at the eDoc provider and at the TMS on the basis of receipt of a key request including the Provider GUID which can be used by the TMS to increment the transaction number. The transaction number is further utilized as a seed value that is fed by the KRVM into a pseudorandom number generator algorithm associated with that provider in order to generate a symmetric key. Because that eDoc Provider and the TMS both can determine/share a transaction number and use that number to seed a PRN generator that is configured alike at both stations, a symmetric key can be generated at each station in synchronization with each other. What is important to appreciate then about the flow of FIG. 16A is that the symmetric key is not transmitted from the eDoc Provider 110 to the TMS in the clear.

Thus, at step 1616A a key request can be received that includes a Provider GUID, a Subscriber GUID, a document type and optionally a transaction number. The KRVM queries a secure database to determine if there is a subscriber relationship in place as between that provider and the identified subscriber for the given document type. For example, the database can comprise the table of FIG. 13 and the query can check if the subscriber 1320 identified in the key request has a relationship with the provider 1315 in the key request. If such a relationship does not exist, then the process flow branches to step 1618, as previously described, to provide a notification of the non-validation. On the other hand, if the KRVM module confirms the relationship, then the process flow continues at step 1620A to determine the value of an asymmetric key that can be utilized to encrypt the symmetric key 1622 that was previously identified and utilized by the Provider to encrypt the content and private metadata. The asymmetrically-encrypted, symmetric key ("AESK") is subsequently returned to the provider in step 1623 to record into a transaction that is ready for distribution across the EM system 102. In particular, the TMS includes a table of keys, as described previously in connection with FIG. 13, and an asymmetric key 1320 can be extracted from the entry in the table that correlates the requesting provider 1315 with the identified subscriber 1310.

Thereafter, the TMS can asymmetrically encrypt the symmetric key that has been independently generated at the TMS and that is the same as the symmetric key that the eDoc Provider uses to encrypt the enriched content for the transaction. At step 1623, the AESK is returned to the eDoc Provider 110. In summary, therefore, the key request 1612A transmits a Provider QUID, a Subscriber GUID, and a document type to the trusted resource that is the TMS 140, and optionally further transmits a transaction number associated with that eDoc Provider. This transmission is sufficient to permit several secure actions at the TMS including: independent generation of a symmetric key; extraction of an asymmetric key associated with that subscriber; and encryption of the symmetric key with the asymmetric key. The eDoc Provider receives the AESK but has no access to any further information about message propagation. The TMS forwards the AESK but has no access to the underlying content; rather, the TMS is the master of keys and relationships while the subscribers to the EM system 102 each have controlled access to the content and managed alerts concerning each transaction. Meanwhile, back at the eDoc Provider, the processor at that station is configured, e.g., by code executing therein, to await the AESK. Once that key is received after step 1623, the eDoc Provider can augment the record and complete the construction of a transaction by adding the AESK to the record. As such, the record includes the encrypted, enriched content and public metadata and now includes the AESK. The transaction includes public metadata in the clear, including a transaction number, that is used by at least the TMS and the eDoc Reader software to distribute the transaction and provide alerts and notifications as described previously. The transaction itself is distributed from the eDoc Provider to the TMS as indicated at step 1613, and the TMS, upon receipt of the transaction, uses the public metadata (in particular, the Provider GUID, the Subscriber GUID, and the document type) to determine the subscriber's address for electronic distribution of this transaction, at step 1620b. Upon distribution, the subscriber can view the content, but equally important, the TMS can supplement the distribution with further addresses based on any copy or forward rules that the subscriber can and may have established with the EM system 102 in accordance with a salient aspect of the invention. Thereafter, the process flow is as previously described and includes transmission of a message to the eDoc Provider to confirm delivery of the transaction (step 1630), transmission of the transaction to the identified subscriber and/or any designated recipient(s) (step 1632), and update of a state database (step 1628).

In one implementation, the module at the eDoc provider executes so as to configure a processor of the eDoc provider's machine to perform symmetric key look-up and encryption with that key, whereas all other interaction with the EM system 102 is under an open application program interface. In other words, block 1607 is not utilized as there may be no template compliance validation module required to validate the template data, at least in this one implementation.

FIG. 17 depicts a flow diagram of the electronic commercial mail document delivery exception and subscriber alerting operation that can be included in embodiments of the preset invention. Providers of mail, whether in physical format or in the form of eDoc transactions can benefit from knowing whether a piece of content has been delivered to the recipient and if it has been "opened." Recipients of mail also can benefit from being alerted to mail that they have forgotten requires action or that needs immediate attention. The present invention incorporates both of these functions by utilizing the standardized public metadata described in FIG. 14. A process at the TMS 140 reviews the EM Transaction State Database 1628 to identify eDoc transactions that have a last activity timestamp that is more than, for example, 24 hours old 1700. Transactions that have not had activity with the past 24 hours are checked for transaction state exceptions 1705 by measuring time intervals against several elements of previously identified metadata about each eDoc transaction on the EM Transaction State Database 1628. A multitude of exception cases may be identified for each transaction, Provider, recipient, and/or document type. Several exception cases are described here but many more can be implemented within the scope of the invention. In addition to identifying delivery exceptions and providing subscriber alerting, the current process also performs a maintenance function to keep the EM Transaction State Database at an efficient size. The exception state checking process identifies transactions that have a state of "delivered and decrypted" by the subscriber as exceptions. This state indicates that a transaction has been received and seen by the subscriber. Process 1710 specifically checks for this state and if it is found to be valid, moves the eDoc transaction from the EM Transaction State Database 1628 to the Completed Transaction Historical Database 1715. If this is not the cause of the exception the eDoc transaction is further reviewed in process 1720 to determine if the exception state requires notification to the eDoc Provider. In one embodiment of the invention, the process determines the elapsed time between the initial eDoc transaction transmission time stamp and the current time. If the time has been longer than a predetermined time and the status of the eDoc transaction is not, at a minimum, delivered to subscriber, then information about the eDoc transaction is passed to a further process that notifies the eDoc Provider of a transaction exception (including a detailed error code as to the nature of the exception), at block 1725. Once the transaction exception has been sent to the eDoc Provider 1725, the EM Transaction State Database 1628 is updated to reflect the further communication and the time at which the action was taken. This updates the activity timestamp utilized to initiate the exception review process.

The eDoc transaction is further reviewed to determine if any of the exception states require subscriber notification (alerting) 1730. In an example of this embodiment of the invention, the process determines how much time remains between the current time and the action-required date. Based on criteria that might be selected by the system or by the EM Subscriber for a specific type of transaction, the process determines if subscriber alerting is required. If alerting is required, the process looks up the alerting methods and contact details for each specific transaction 1735. The alerting methods and details can be identified through communication with the EM RDS 130. Once the methods and details have been determined, the actual alerts are sent to subscribers 1745 and the EM Transaction State Database 1628 is updated to reflect the further communication and the time at which the action was taken. This updates the activity timestamp utilized to initiate the exception review process.

Referring briefly to FIG. 18, the eDoc Provider station 110 can have its processor configured to include a template compliance validation module (TCVM) 1800, such as in the form of code executing in the processor. The TCVM 1800 can be a secure module provided by the TMS and arranged to operate as a "black box" so that its inputs and outputs are defined by the TMS and its operation is secure. The reason for this is that the TMS occupies a position of trust in the EM system 102 and the TCVM enables validation at each content provider of their correct use of a standard template provided by the TMS for use in various transactions. In this way, the EM system can extend the standard templates and have control over compliance at each content provider and individual content providers have an impediment to using the EM system to distribute content that is not in conformance with an accepted content-type for the industry/sub-industry of any particular eDoc Provider.

At step 1802, the TCVM is invoked at the eDoc Provider station, such as in response to the provider having content that is ready to be distributed to a particular subscriber. The module obtains the content (eDocument), private metadata associated with the content/subscriber by the eDoc Provider, and public metadata of the same type. At block 1804, the module identifies the content-type, which is one of the fields common to the public metadata of each of the standard templates used in the EM system 102. At block 1806, metadata is extracted such as fields among the private and public metadata. For instance, the TCVM 1800 can pop a field from the private metadata into a register that is accessible to the processor of the eDoc Provider station. At block 1808, the extracted data is compared to the standard fields of the template for the identified content type. Thus, for instance, each or selected fields of a standard template for a given content-type can be compared to the extracted data to determine whether those values conform to variable definitions for the standard template. Typical variable definitions include, currency, date, time, integer, real, alphanumeric, and so on. At block 1810, a determination is made as to whether the validation is satisfied. If the test is not satisfied, the proposed transaction cannot advance further in the EM system 102. On the other hand, if the content provider has constructed a record in conformance with the standard template (such that all subscribers receive content and controls that are consistent for a given content type, as only the independent, trusted, EM system is able to enforce), then the eDoc Provider station can obtain a PRN key at step 1812, substantially as described above. Briefly, a transaction number can be used to seed a PRN generator module and output a symmetric key. The content and the private metadata for the transaction is encrypted at step 1814 using the symmetric key. Next, step 1612A is performed as described above (see FIG. 16A), and the TCVM module at the eDoc Provider station then awaits receipt of the AESK, as indicated at step 1816. Finally, as described above, the eDoc Provider station can complete the record and distribute a fully constructed transaction to the TMS, as indicated at step 1613.

Referring again to FIG. 15 and also to FIG. 19, a demand-based vendor-referral service is illustrated as a further feature provided through the EM system 102. By way of background, the acceptance between subscribers and providers as has been described establishes a trusted relationship that authorizes a flow of messages between such subscribers and providers. This flow of messages can, and is anticipated to, greatly diminish the volume of first class mail that is presently being sent through the U.S. and other postal systems. Another variety of mail that passes through the postal systems is pre-sorted mailers that are conventionally used to advertise local services, products for the home, and so on. Sometimes, this variety of mail is referred to as "junk" mail as it is unsolicited and may be promoting products or services for which the recipient has no present interest. Yet, the reduced revenue from first class mail that results from the adoption of a system as described herein means that the cost of supporting pre-sorted mail to the same postal customers effectively increases as it is no longer being supported by the revenue of first class mail to the same addresses. Economics aside, in accordance with a further, optional aspect of the invention a demand-based vendor-referral service can be implemented so as to provide local service referrals to a subscriber in need of a product or service. For instance, if the subscriber is in need of a plumber, or a pet fence, or wishes to use a different lawn care vendor, the EM system 102 can provide referrals in lieu of a yellow pages or other junk mail, as described next.

Thus, in support of a demand-based (as opposed to unsolicited) vendor referral service, and in the event that a subscriber is in need of a local service, a control such as a "local service" button 1560 can be provided to navigate the subscriber to a page that can be tailored to provide a selection of local vendors that are known to the EM system 102. Alternatively, the subscriber can input and submit search criteria to locate a local service using another interface component such as a text box 1562. The subscriber can be presented through the eDoc reader or possibly through a web-accessible portal supported by the EM system and accessed via interaction with the button 1560 or text box 1562, with a selection of local vendor advertisements suited to the subscriber's present interest (e.g., plumbers as a result of the subscriber indicating an interest in seeing local plumbers). The results provided by the EM system are unlike those that can be provided by a conventional search engine in several respects. First, the EM system has information about the subscriber from the subscriber profile including the subscriber's physical address and current vendor relationships (e.g., which lawn care company the subscriber uses and which oil company the subscriber uses). Second, the EM system has information about other subscribers in the same local area, including their zip code and address and provider relationships. As such, in view of these data, the EM system has the ability to identify plumbers that have been used by persons that live near the subscriber and who have one or more providers in common. As a result, a vendor referral (e.g., for a plumber, etc.) can be presented in combination with further data to assist the subscriber in making a vendor selection. The further data can be masked to varying degrees, so as to output the selection in a number of ways as shown below in Table A (no masking), Table B (moderate masking) and Table C (heavy masking):

| Table A | Table B | Table C |
|---|---|---|
| Joe Plumber | Ace Plumbing | Cheap Plumbers |
| Recent customers: | Recent customers: | Recent customers: |
| Cheryl N'bor | 1 on your street | 1 in your zip |
| 37 East Lake Drive | (East Lake Drive) | code (10536) |
| Amount Paid: $340.00 | Amount Paid: | Amount Paid: |
| Common Providers: | Common Providers: | Common Providers: 2 |
| Jimmy Lawn Care; | 1 local service and | |
| Citibank | 1 financial institution | |
| Offers: 10% | Offers: 10% | Offers: 10% |
| discount in August | discount in August | discount in August |
| for new customers | for new customers | for new customers |

The information in the tables above for presentation to the subscriber differs from most, conventional vendor flyers because they are provided in relation to actual selections by neighbors and other local persons. As well, each vendor that is identified is a provider on the EM system and, as such, is at least partially authenticated as a vendor that can be paid and managed through the eDoc reader software 750a, exactly as described above, a departure from all conventional vendor flyers. A subscriber's selection of a vendor in response to the local service referral service means that the subscriber can pay the vendor, manage the relationship, manage capital improvement costs via electronic tags, and so on, using the auspices of the EM system described herein.

In part, the EM system 102 includes a server, a relationship database 1900, a subscriber database 1902 and a provider database 1904. The various databases are all in communication with the server. The subscriber database 1902 identifies each of a plurality of subscribers to the EM system, with each subscriber having a subscriber profile (described below, but including at least a subscriber location and one or more established relationships with one or more of a plurality of providers). The provider database 1904 identifies a plurality of providers registered with the system and includes their respective GUIDs.

As shown in FIG. 19, an eDoc transaction processing module 1920a executes within the processor of the server of the EM system 102. The module 1920a comprises the code executing in the processor to direct in a controlled manner encrypted content between one of the plurality of subscribers and one of the plurality of providers. While the content itself is secure (encrypted by the AESK) and therefore not readable by the EM system, the metadata that accompanies the encrypted content provides information suitable for directing the content between the appropriate subscriber and provider. A tracking module 1920b also comprises code executing within the processor of the server of the EM system 102 and is operative to monitor the metadata so as to identify an eDoc transaction that corresponds to a payment transaction that has been made between any of the plurality of subscribers and any of the plurality of providers. The tracking module, upon identifying such a transaction, writes data to the relationship database 1900 that includes at least the identity of the provider and the identity of the subscriber in that payment transaction. The server of the EM system also includes a request processing module 1920c comprising code executing within the processor of the server that responds to a request receiving from a subscriber through a communication link such as is shown in FIG. 19 by the connection between the subscriber, the network 100, and the EM system 102 server. The request identifies a vendor service of interest to the particular subscriber (e.g., the subscriber needs a plumber). Other requests can be received from the subscriber, and an example is discussed below. The request processing module 1920c is operative to obtain a location of the particular subscriber from the subscriber database 1902. The module also determines a set of providers within the provider database 1904 that provide the vendor service of interest to the particular subscriber (that is, the service that was in the request), and which are within a prescribed tolerance of the obtained subscriber location. The tolerance can be prescribed in terms of distance, zip code and otherwise. For instance, the zip code might have to be the same, or the difference when one is subtracted from another being no more than a specified value. The module operates to identify a particular provider within the determined set of providers that is included in the relationship database 1900. As such, the particular provider is one with whom there has been a payment transaction, as that is required for the provider to be in the relationship database. An ad server module 1920d is in communication with the request processing module 1920c and also comprises code executing within the processor of the server. The ad server module configures the processor to cause an ad of the particular provider that was just identified to be served to the particular subscriber's machine in reply to the request.

In accordance with still a further, optional aspect, any vendor identified by the EM system can be presented together with customer reviews ("feedback") that are based on feedback from subscribers to the EM system. Such reviews can further inform a particular subscriber when making a selection of that vendor. First, as can be appreciated, any selection by a particular subscriber is informed at least by other local subscriber's selections as shown in the tables above. In addition, feedback from other subscribers can be provided with comments from persons who have used that vendor. In one arrangement, the comments can be presented together with the local ads. In another arrangement, the comments can be accessed using hyperlinks that can be provided (see underlined text in the tables above) to lead the particular subscriber to such further information. Still further arrangements have the reviews available for perusal prior to any particular subscriber selecting that vendor. The feedback is provided, for example, by either the request processing module 1920c or the ad server module 1920d. Optionally, either of these modules can mask a portion of the subscriber details relating to the source of the feedback, as described in connection with Tables A, B and C.

Moreover, not only can the feedback that is provided to the subscriber be limited to providers within a prescribed tolerance of the subscriber's location, the feedback can be "local," that is, only those other subscribers that satisfy a prescribed geographical constraint can be included among the feedback provided to a particular subscriber. For instance, only feedback from other subscribers within the same zip code can be provided to the particular subscriber that is requesting a local vendor service. The geographical constraint can be more broadly defined, such as to include the same borough, city, county, state, or region, as non-limiting examples. In like manner, feedback to the subscriber requesting a local vendor service can be limited to comments from other subscribers that have a certain number of prescribed relationships in common with that subscriber. For example, the feedback of other subscribers can be sorted in descending order of common providers, and the comments of subscribers with the most providers in common can be presented to the subscriber in decreasing order until a cut-off of no more comments. Thus, if the requesting subscriber uses the same lawn care and the same oil company as a person providing feedback on a plumber, this could be ranked higher than another subscriber nearby (e.g., same street or zip code) that has no providers in common. Optionally, a permission is maintained (stored) in the relationship database 1900 that governs whether a feedback entry can be served in response to a request for a local ad. The permission can be assigned manually by the person providing the feedback by indicating whether permission is granted or not and writing that to the relationship database, or the permission can be a system-changed parameter that is updated programmatically, for example, to restrict distribution of stale feedback comments after a period of time, and on other programmatic bases.

The ability of a subscriber to input and post a review of a particular vendor can be controlled by the EM system, as described next. The EM system preferably restricts reviews to subscribers that have a mutual accepted provider/subscriber relationship with the vendor. Optionally, a customer-review of a particular vendor is further limited to those subscribers that have made a payment to that particular local vendor. Because the public metadata 1410 (see FIG. 14) includes the GUID of the provider (here, the local vendor), and the document type (here, say, an invoice), and because the existence of a subscriber payment against such invoices are preferably made through the EM system, the EM system can track as a background process the document distribution (without access to the secure content therein) and build a relationship database in support of local ad service through the eDoc reader or other interface to the eDoc transactions being distributed through the EM system. More specifically, as EM transaction numbers are issued or as eDocs are conveyed through the EM system, records or entries are added to a relationship database 1900 that is referenced in connection with providing reviews of local vendors. The relationship database is in communication with the EM system 102 server, such as via SQL or other database queries.

Thus, when a particular subscriber 160 wishes to review local ads through the EM system 102, the system accesses an advertisement server 1910 to deliver an ad to the particular subscriber. The selection of ads to provide to the particular subscriber is made by the EM system 102 by accessing the relationship database 1900 to determine the providers that are to be referred to the particular subscriber. The referral is preferably made in accordance with an algorithm that optimizes one or more criterion(ia), such as good feedback ratings by other subscribers who have a prescribed proximity to the particular subscriber, how recent the feedback rating(s) is(are), number of providers of at least a certain type in common between the reviewing subscriber and the particular subscriber, or a combination of these factors. Optionally, the particular subscriber can probe the algorithm and add or remove criteria, change weightings, and so on, to adjust the basis for the selection of referrals.

As such, the presentation of vendor ads (wherein, each vendor is one of the providers 110 registered with the EM system 102) can be married to feedback from other subscribers in the particular subscriber's geographic vicinity, to the extent that such feedback is available. As a default, if there are no vendors that have been reviewed by other subscribers, the system 102 can return the vendors that are relevant to the particular subscriber's inquiry (e.g., the plumbers in Westchester County, New York, if that is where the particular subscriber resides). Those providers that do better work, have favorable pricing or are otherwise able to garner good feedback, gain the benefit of positive reviews that support a social networking functionality of the EM system 102 that improves upon impersonal flyers that are ubiquitous today.

A further, optional feature is to include an anonymous reference request module 1920e (ARR module) that is configured to process a request from the particular subscriber to obtain feedback from other subscribers, either when there is no feedback on a particular vendor/provider, or to augment the existing feedback. The ARR module can interrogate the relationship database 1900 using parameters provided by the particular subscriber (e.g, my zip code, last 4 weeks) to identify other subscribers who have actually used the provider about which the requesting subscriber is seeking feedback. The module then causes a message to be sent to such other subscribers seeking feedback on the vendor that the particular subscriber is interested in using. The recipient of such a message can accept or deny it, using controls configured similar to controls 1530 in FIG. 15, and if the message is accepted, a form is provided for quick completion by the subscriber. If accepted, then the feedback is served to the requesting subscriber, in general fulfillment of a social-networking role that the EM system 102 can provide in this respect. Optionally, one of the controls on the form can be whether the recipient permits the reference to be part of the publicly viewable feedback. In this way, feedback generated as a result of prompts from other subscribers to the EM system, but also can be solicited by the EM system once the system has tracked a subscriber payment against an invoice of the vendor, as described above.

As is conventional in the computer-based advertising art, the ad can be delivered to the particular subscriber 160 by the EM system 102, or the EM system can embed a link in a file delivered to the particular subscriber (e.g., in a web-browser compatible page), that is processed at the subscriber's machine and causes its browser software to access the advertisement server, 1910 directly. The advertisement server 1910 stores the ads for local vendors who are providers 110 registered with the EM system. As will be appreciated, the advertisement server can be part of the EM system itself or can be a service provided by a third party to support this functionality of the EM system.

Referring now to FIGS. 19 and 20, an inquiry service module 1920*f* is described which can be included among provider equipment to provide an enhanced interface to the EM system 102 over a distributed computer network 100, such as the Internet. The inquiry service module enables a subscriber to identify one of several accounts that are maintained by services provided by a given provider. This arrangement can occur, for example, when a subscriber has a number of pre-existing accounts with the provider, such as a checking account, a savings account, a money market account, and one or more brokerage, IRA, and 401(k) accounts with the same provider. To establish a mutual relationship between this subscriber and each of the accounts at the provider 110, an inquiry service module 1920*f* is disposed outside of a firewall 2010 of the provider, and communicates through a designated port with a router 2020 under control of the provider. The EM system 102 provides a portal that transmits one or more encrypted messages including content between the subscriber and the provider. The EM system provides forms, databases, and code that execute to establish one or more relationships between the subscriber and the provider, as described previously. Among the databases is the subscriber database 1902 which is under control of the electronic message portal and includes authentication data concerning each subscriber (e.g., address, last four digits of the subscriber's social security number), and also maintains a list of any established relationships between each subscriber and each provider. When the subscriber wishes to add a particular provider, such as the one illustrated in FIG. 20 with multiple services 2030*a-d* and respective reference databases 2040*a-d*, the EM system server uses a subscription request module (generically indicated as one of modules 1920*g*) to combine the subscription request by the subscriber with at least a portion of the authentication data in the subscriber database 1902 concerning that subscriber so as to define an inquiry message. The inquiry service module 1920*f* executes on provider equipment and is exposed outside of the firewall 2010 so that it can process each inquiry message received from the electronic message portal, identify the subscriber with the plurality of pre-existing accounts using the authentication data by matching that data against the records maintained by the provider, and communicate each pre-existing account identified with the subscriber back to the electronic message portal. In this way the portal can take the identified, pre-existing accounts and establish a relationship between the subscriber and the provider for each such account.

As will be appreciated, the process flow can be implemented by code executing in a processor and configured to provide the functions described above, and can be implemented in response to subscriber-interaction with one of the interfaces described above and, as such, a practical implementation of the invention does not necessarily perform each of the steps illustrated in the flow diagrams nor does it necessarily execute in the order illustrated. Rather, the flow diagrams are provided for purposes of discussion and not limitation of the invention In conclusion, embodiments of the invention can create a private network of providers and recipients that establishes each registrant as being the entity they claim to be and provides a guaranteed, unique identifier (GUID). The QUID for a recipient may be associated with multiple physical locations and can be associated with any email address the recipient chooses. The private network utilizes existing email infrastructure and protocols for distribution but implements its own security and content protocols to secure content, implement delivery tracking and automate document management. The GUID for a provider may be based on a single legal entity or subdivisions within an entity. The implementation of GUIDs allows providers to know that they are sending documents to the intended recipient without the requirement to validate each email address or other contact data. For recipients, GUIDs allow for aggregation across multiple providers and redirection of delivery location with a single entry.

Embodiments of the invention can standardize attributes about each document being conveyed in the system so that many parts of the mundane processes associated with existing document distribution systems can be automated. For example, attribute management using components described herein enable control over the presentation of documents, action-reminders, and archiving by date, provider, type, or role (e.g., the user is a forwarded recipient).

Embodiments of the invention can enable the recipient to control which providers can send documents to their GUID and what types of documents each provider can send to the recipient. This functionality will be controlled through the use of a subscription process and stored profile information. When initiated by recipients, the subscription process can be immediate. When initiated by providers, the subscription process requires recipient acceptance or "opt-in." The subscription process can be automated utilizing pre-existing sources of data, can be driven by search criteria or can be facilitated by direct entry of a GUID. No document will be distributed without a valid subscription. Unique identifiers as well as routing limitations enable the recipient's Email Provider to easily separate email traffic from the document distribution network, and, more generally, enable controlled presentation of each subscriber's eDocuments to only the intended subscriber regardless of whether an email Provider is used or whether, for example, the eDoc reader is provided by a portal served by the EM system 102.

Embodiments of the invention can provide a higher degree of security to the recipient than is current practice for both physical mail and traditional email. This functionality can be accomplished through the use of an automated, double encryption code. As described herein, a symmetric key can be used to encrypt messages, with the system 102 including a machine that receives the symmetric key and encrypts that key with an asymmetric key. The message (e.g., email) is ultimately conveyed to the viewer in an encrypted format. The message is encrypted with the symmetric key and so are the standardized attributes concerning the content of that message, but the symmetric key is not communicated as such. Rather, the symmetric key is communicated in a further encrypted form, namely, after encryption by a second, asymmetric key. In one embodiment, the encrypted document, the encrypted symmetric key and accompanying content-attributes (necessary to manage the distribution) are communicated by a machine associated with the system 102 rather than the content provider itself (e.g., a transaction management station) which utilizes the public key of the recipient's GUID to encrypt that content provider's encryption key. Utilizing this methodology, all document messages stored anywhere on the Internet can be encrypted and document distribution can be limited to the recipient because the "public" key will not be widely distributed.

Embodiments of the invention also can enable providers to determine if a document has been delivered with a high degree of accuracy. To facilitate this functionality, the document distribution network adds a unique document identifier to each distributed document and tracks the delivery status of each document. The first state of document delivery is an acknowledgement that the transaction has reached the recipient's mail server; the second state is an acknowledgement that the recipient's mail client has received the transaction. The final delivery state is recorded when the recipient has decrypted the document. The decryption and response are automated by the recipient's application and, if the recipient is offline at the time of decryption, the result is stored until the user next retrieves email of any type or otherwise signs-in to view eDocs. Exceptions to delivery can be reported for follow-up action, and details of all delivery data can be available for auditing and other purposes.

Embodiments of the invention can ensure that users do not forget to retrieve or take required action on documents on a timely basis. The delivery state mechanism described above can also be used to trigger alarms to the recipient. Such alarms can be triggered by time and state rules for each document provider, each document type or both, and be delivered through a combination of email to alternative addresses, text messages or even text-to-voice messaging to traditional voice communication devices.

Embodiments of the invention can to allow recipients to set up automated forwarding and copying of documents to other, generally related, recipients. A typical instance of the requirement for this feature is a document addressed to an older parent or disabled sibling who has his or her messages managed by a different recipient. To facilitate this functionality, a recipient creates, on the document distribution network, a "copy" or "forward" functionality to another recipient. This functionality can be on a complete or partial basis (specified by provider or document type, for example). Another example is when an invoice is addressed to a husband or wife but is generally paid by the other spouse.

Embodiments of the invention also can allow financial intermediaries to search, identify, access and store the GUID and profile data of each registered provider. Provider profile data includes mailing address as well as account data to facilitate electronic payments. This functionality allows financial intermediaries to access data required to deliver payments to provider members of the network as instructed by subscribers who are customers of each financial intermediary. The utilization of standardized GUIDs in transactions initiated by providers insures that payments will be sent to the correct provider in the most expeditious manner possible. In this regard, the system 102 can allow financial intermediaries to send specialized messages so as to update transaction statuses and provide Providers and Subscribers with more comprehensive message management. For example, the financial intermediary can provide notification of completed payments to improve auditing and more detailed alerts for the benefit of the subscriber. Subscriber profile data can include the subscriber's physical address, current vendor relationships, and any action preferences that the subscriber inputs to the EM system 102 in relation to the providers with whom the subscriber has a relationship. As a non-limiting set of examples, the action preferences can include: an auto payment preference to pay any invoices from certain providers; an auto payment preference to pay if the invoice is below a threshold amount or within a prescribed percentage of one or more prior invoices from that vendor; an auto-forward setting to send to an accountant or other trusted person; and an auto archive setting to archive in a number of days after reading the message or after an invoice has been paid.

The foregoing system can be utilized in connection with retail purchase transactions with retailers (providers) who are either already matched to the subscriber through a subscription relationship, or with retainers with whom the subscriber does not have a subscription relationship. Either party to the purchase transaction can provide an ID to the other party together with a key that uniquely identifies the transaction. Thus, the subscriber can provide his or her Subscriber GUID, or the provider can provide its provider GUID. The provider can simply print a code on the receipt that the subscriber can scan or otherwise enter to automatically establish a subscription relationship with that provider. That code can be printed or otherwise communicated to the subscriber with a unique key to identify the particular transaction. The subscriber can be provided with a set of keys either on paper or in a smartphone application that can be conveyed to the retailer together with the subscriber GUID.

The unique code is a one-time code that, together with the QUID, allows the parties to the retail transaction to identify each other and establish a subscription relationship. By way of example, and not limitation, a subscriber can purchase a couch at a furniture store. The subscriber wishes to manage the purchase for warranty or insurance purposes and so he or she gives the retailer his or her Eco-mail Subscriber GUID and a one-time key that the Eco-mail system generated. The subscriber can have a seat of several such codes generated at any given time for use in separate purchase transactions. Once given to the retailer, the receipt can be routed through the EM system and a subscription relationship can be created as a result in the same manner as described previously. Once the relationship is established, the subscriber can decide through eDoc reader software 750a prompts and the like whether other notifications (e.g., specials) are desired.

A collateral benefit of establishing relationships with various retailers for off-line (physical world) purchases is the prospect of auto-reconciliation of receipts with credit card statements and checking account transactions.

While the invention has been described in connection with certain embodiments, it is defined by the claims that accompany this description and is not to be read as being restricted to any one embodiment thereof.

I claim:

1. A computer-implemented system for managing transmission of encrypted electronic documents over a network between providers and subscribers, the electronic documents including publicly inspectable metadata, comprising:

a database having a plurality of subscriber addresses and one or more supplemental addresses associated with each subscriber in relation to a document-type of a provider, and the database further identifying subscribers' trusted relationships with respective providers;

a management station for routing electronic documents between providers and subscribers, the management station having a hardware processor and a memory, wherein the processor is configured by code executing therein to, for each of the electronic documents:

receive a particular electronic document, the particular electronic document having publicly inspectable metadata and identifying a respective provider and a respective subscriber, obtain the publicly inspectable metadata associated with the particular electronic document, retrieve from the database routing information for the particular electronic document on the basis of the obtained metadata, route the particular electronic document to the respective subscriber in accordance with the retrieved routing information;

wherein, the processor is further configured to record, in the database, the subscribers' trusted relationships with respective providers, wherein the trusted relationships are determined based on the routing of the electronic documents between the providers and subscribers;

a communication link connectable to a device of the particular subscriber, wherein the processor is further configured by code executing therein to:

respond, through the communication link, to a request that identifies a vendor service of interest to the particular subscriber;

obtain the subscriber location of the particular subscriber;

determine a set of providers that provide the vendor service of interest and that are within a predefined distance from the obtained subscriber location, and that are identified in the database as having at least one trusted relationship with at least one other subscriber located within a predefined distance from the obtained subscriber location, the at least one other subscriber being different from the particular subscriber;

identify a particular provider within the set of providers; and cause an ad of the particular provider to be served to the particular subscriber's device in reply to the request.

2. The computer-implemented system of claim 1, wherein the management station is further configured to:

retrieve from the database alerting rules information for the particular electronic document on the basis of the metadata; and construct one or more alert messages for the particular electronic document in accordance with the retrieved rules and the metadata; and route alerting messages to the a) subscriber address, b) any supplemental addresses, or both a) and b).

3. A computer-implemented system in furtherance of providing a demand-based referral exchange between a particular subscriber and a provider on the basis of trusted relationships between subscribers and providers, comprising:

an electronic message portal comprising a machine having a processor and a memory and a communication link and configured to i) transmit encrypted messages including content between subscribers and providers and ii) establish one or more trusted relationships between the subscribers and the providers based on the transmitting of encrypted messages therebetween, the encrypted messages including publicly inspectable metadata;

a subscriber database under control of the electronic message portal and having a plurality of subscriber addresses and one or more supplemental addresses associated with each of a plurality of subscribers, wherein routing of encrypted messages from the content provider is defined by the subscriber database and is to: a) one of the subscriber addresses, b) at least one of the one or more supplemental addresses associated with the subscriber, or both a) and b), the subscriber database further identifying subscribers' trusted relationships with respective providers;

wherein, for each of the plurality of encrypted messages, the processor is further configured by executing code and operative to:

receive a particular encrypted message;

obtain publicly inspectable metadata associated with the particular encrypted message and that identifies a respective provider and a respective subscriber;

retrieve, from the subscriber database, routing information for the particular encrypted message on the basis of the obtained metadata;

depending on whether a valid subscription agreement exists between the respective provider and the respective subscriber, either:

cause the particular encrypted message to be routed to the respective subscriber in accordance with the routing information, or otherwise, in the event that a valid subscription agreement does not exist, notify the respective provider of a transaction exception;

record, in the database, the respective subscriber's trusted relationship with the respective provider, wherein the trusted relationship is determined based on the routing of the encrypted message between the respective subscriber and the respective provider wherein, the processor is further configured to:

respond, through a communication link connectable to a device of a particular subscriber, to a request that identifies a vendor service of interest to the particular subscriber;

obtain a subscriber location of the particular subscriber;

determine a set of providers that provide the vendor service of interest and that are identified in the subscriber database as having at least one trusted relationship with at least one other subscriber having a location proximate to the obtained subscriber location, the at least one other subscriber being different from the particular subscriber;

identify a particular provider within the set of providers; and cause an ad of the particular provider to be served to the particular subscriber's device in reply to the request.

4. The system as in claim 3, wherein the encrypted messages from the content provider are encrypted using a symmetric key.

5. The system as in claim 4, wherein the symmetric key is asymmetrically-encrypted (AESK) in relation to a particular subscriber to whom the encrypted message is intended, and wherein the symmetric key is provided to the electronic message portal in the AESK form together with the encrypted message and the publically inspectable metadata.

6. The system as in claim 5, wherein a public asymmetric key portion is securely retained at the electronic message portal.

7. The system as in claim 3, wherein the subscriber database includes authentication data concerning each subscriber and any established relationships between each subscriber and each provider.

8. The system as in claim 3, wherein, in the event that a valid subscription agreement does not exist, the processor configured by executing code does not cause the particular encrypted message to be routed to any subscriber.

9. The system as in claim 3, wherein the metadata of the encrypted messages includes a document-type of the content provider, and wherein the routing of encrypted messages from the content provider by the electronic message portal is defined by the subscriber database in relation to the document type.

10. The system as in claim 9, wherein the valid subscription agreement check further checks the document type.

11. The system as in claim 3, further comprising a reader comprising code executing, at least in part, on a machine of the subscriber and configured to decrypt and present the content in the one or more encrypted messages received from the electronic message portal.

12. The system as in claim 11, wherein the encrypted message includes private metadata, and wherein the code executing in the reader influences a display of the content in the encrypted message on the basis of both the public metadata and the private metadata.

13. The system as in claim 3, wherein the processor configured by executing code is further operative to:
retrieve from the database alerting rules information for the particular encrypted message on the basis of the metadata; and
construct one or more alert messages for the particular encrypted message in accordance with the retrieved rules and the metadata; and
route alerting messages to the subscriber address, any supplemental addresses, or both.

14. The system as in claim 3, further comprising:
a relationship database in communication with the electronic message portal, and
wherein the processor configured by executing code is further operative to:
 (1) monitor the transmissions of encrypted messages from the electronic message portal;
 (2) identify a payment transaction made to any of the plurality of providers using a portion of the metadata, and
 (3) include in the relationship database at least the identity of the provider and the identity of the subscriber in said identified payment transaction.

15. The system of claim 14, wherein the processor configured by executing code is further operative to serve to the particular subscriber's device feedback received from at least one of the plurality of subscribers and stored in the relationship database concerning services provided by the particular provider, wherein the relationship database stores a permission concerning whether the feedback is to be served to in response to the request, and wherein at the least one of the ad server module and the request processing module is operative to serve the feedback to the particular subscriber's device in accordance with the permission.

16. The computer-implemented system of claim 3, wherein the processor is configured to determine the set of providers by:
identifying, using the relationship database, one or more providers that provide the vendor service of interest, are within a predefined distance from the obtained subscriber location, and have a trusted relationship with at least one other subscriber that is located within a predefined distance from the obtained subscriber location, and b) has a trusted relationship with at least one other provider having a trusted relationship with the particular subscriber.

17. The computer-implemented system of claim 3, wherein the processor is configured to determine the set of providers by:
identifying, using the relationship database, one or more providers that provide the vendor service of interest, are within a predefined distance from the obtained subscriber location, and have a trusted relationship with at least one other subscriber that is located within a predefined distance from the obtained subscriber location, and b) has a trusted relationship with at least one other provider having a trusted relationship with the particular subscriber.

18. A computer-implemented system in furtherance of providing a demand-based referral exchange between a particular subscriber and a provider on the basis of trusted relationships between subscribers and providers, comprising:
an electronic message portal comprising a machine having a processor and a memory and a communication link and configured to i) transmit encrypted messages including content between subscribers and providers and ii) establish one or more trusted relationships between the subscribers and the providers based on the routing of encrypted messages therebetween, the encrypted messages including publicly inspectable metadata;
at least one database accessible to the electronic message portal and having a plurality of subscriber addresses and one or more supplemental addresses associated with each of a plurality of subscribers, wherein routing of encrypted messages from providers is defined by the at least one database and is to: a) one of the subscriber addresses, or b) at least one of the one or more supplemental addresses associated with the subscriber, or both a) and b), the at least one database further identifying subscribers' trusted relationships with respective providers;
wherein the processor configured by executing code is further operative to:
 (1) monitor the routing of encrypted messages by the electronic message portal;
 (2) identify encrypted messages having metadata indicative of a transaction between a respective provider and a respective subscriber, and
 (3) for each identified encrypted message, record, in the at least one database, at least the identity of the respective provider in association with the identity of the respective subscriber, thereby recording the trusted relationship therebetween; and
wherein, the processor is further configured to:
respond, through a communication link connectable to a device of a particular subscriber, to a request that identifies a vendor service of interest to the particular subscriber;
obtain a subscriber location of the particular subscriber;
determine a set of providers that provide the vendor service of interest and that are within a predefined distance from the obtained subscriber location and that are identified in the at least one database as having at least one trusted relationship with at least one other subscriber, the at least one other subscriber being different from the particular subscriber;
identify a particular provider within the set of providers; and
cause an ad of the particular provider to be served to the particular subscriber's device in reply to the request.

* * * * *